United States Patent
Forster

(10) Patent No.: US 7,535,215 B2
(45) Date of Patent: May 19, 2009

(54) APPARATUS AND METHOD FOR THE DETERMINATION OF A DIRECTION OF AN OBJECT

(75) Inventor: Bernhard Forster, Finkenstein (AT)

(73) Assignee: Infineon Technologies AG, Munich (DE)

( * ) Notice: Subject to any disclaimer, the term of this patent is extended or adjusted under 35 U.S.C. 154(b) by 0 days.

(21) Appl. No.: 11/100,231

(22) Filed: Apr. 6, 2005

(65) Prior Publication Data

US 2005/0258820 A1    Nov. 24, 2005

(30) Foreign Application Priority Data

Apr. 7, 2004    (DE) .................. 10 2004 017 191

(51) Int. Cl.
*G01B 7/14*    (2006.01)
*G01P 3/42*    (2006.01)

(52) U.S. Cl. ............. 324/165; 324/207.22; 324/207.23; 324/174; 324/207.21; 324/207.2

(58) Field of Classification Search .................. 324/165, 324/233, 228, 173–175, 207.11–207.26
See application file for complete search history.

(56) References Cited

U.S. PATENT DOCUMENTS

| | | | | |
|---|---|---|---|---|
| 5,367,257 A | * | 11/1994 | Garshelis | 324/207.22 |
| 5,880,586 A | * | 3/1999 | Dukart et al. | 324/207.2 |
| 6,242,905 B1 | | 6/2001 | Draxelmayr | 324/165 |
| 6,304,074 B1 | * | 10/2001 | Waffenschmidt | 324/202 |
| 6,744,248 B2 | | 6/2004 | Buchhold et al. | 324/207.21 |
| 2003/0205998 A1 | | 11/2003 | Heremans et al. | 324/165 |
| 2004/0108850 A1 | * | 6/2004 | Wolf et al. | 324/207.2 |

FOREIGN PATENT DOCUMENTS

EP        0788573      10/1995

* cited by examiner

*Primary Examiner*—Reena Aurora
(74) *Attorney, Agent, or Firm*—Eschweiler & Associates, LLC

(57) ABSTRACT

An apparatus for the determination of a momentary relative direction of an indicator object depending on a magnetic field influenced or generated by the indicator object includes first means for sensing a course of a first magnetic field component of the magnetic field, second means for sensing a course of a second magnetic field component of the magnetic field, and means for evaluating the course of the first magnetic field component and the second magnetic field component in order to determine the momentary, relative direction of the indicator object, the first magnetic field component and the second magnetic field component being offset in angle with respect to each other.

30 Claims, 8 Drawing Sheets

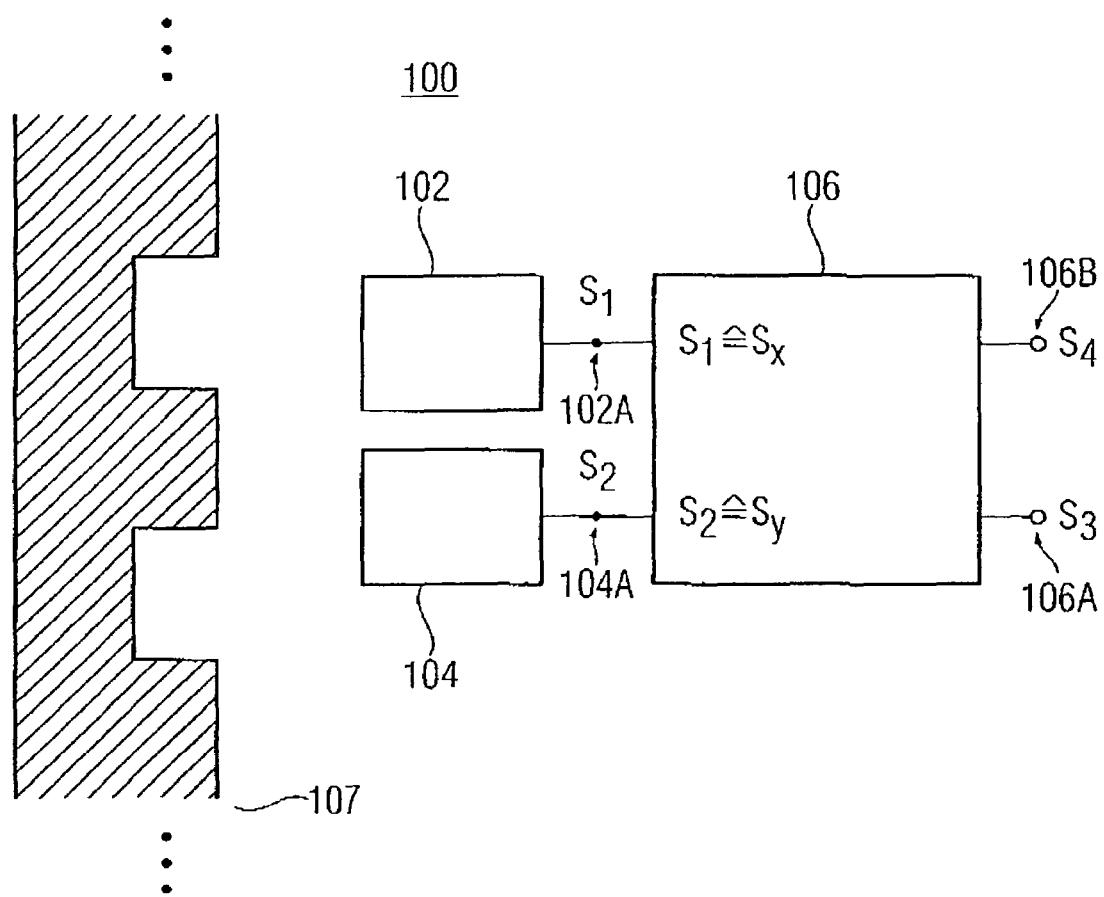

WP - REVERSAL POINT

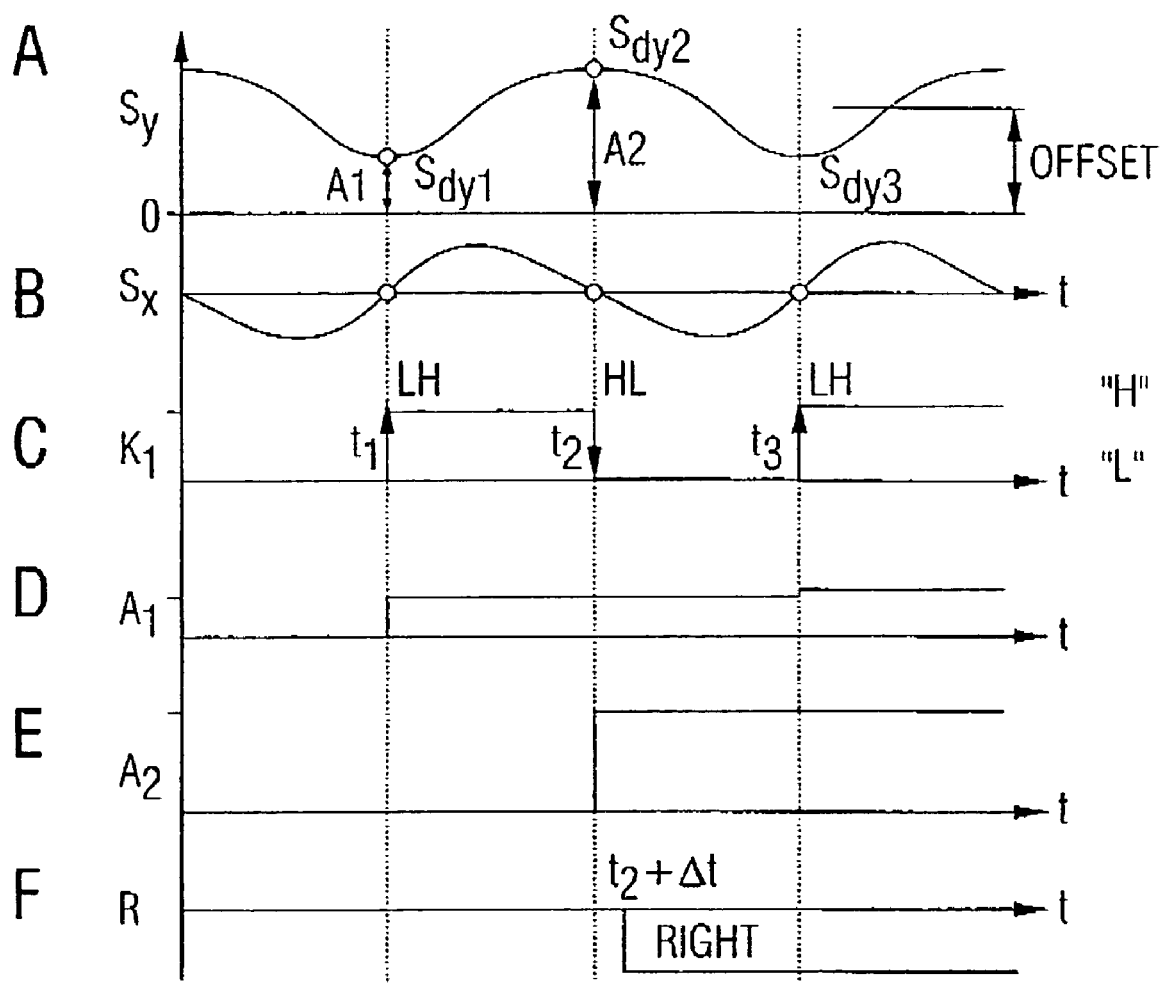

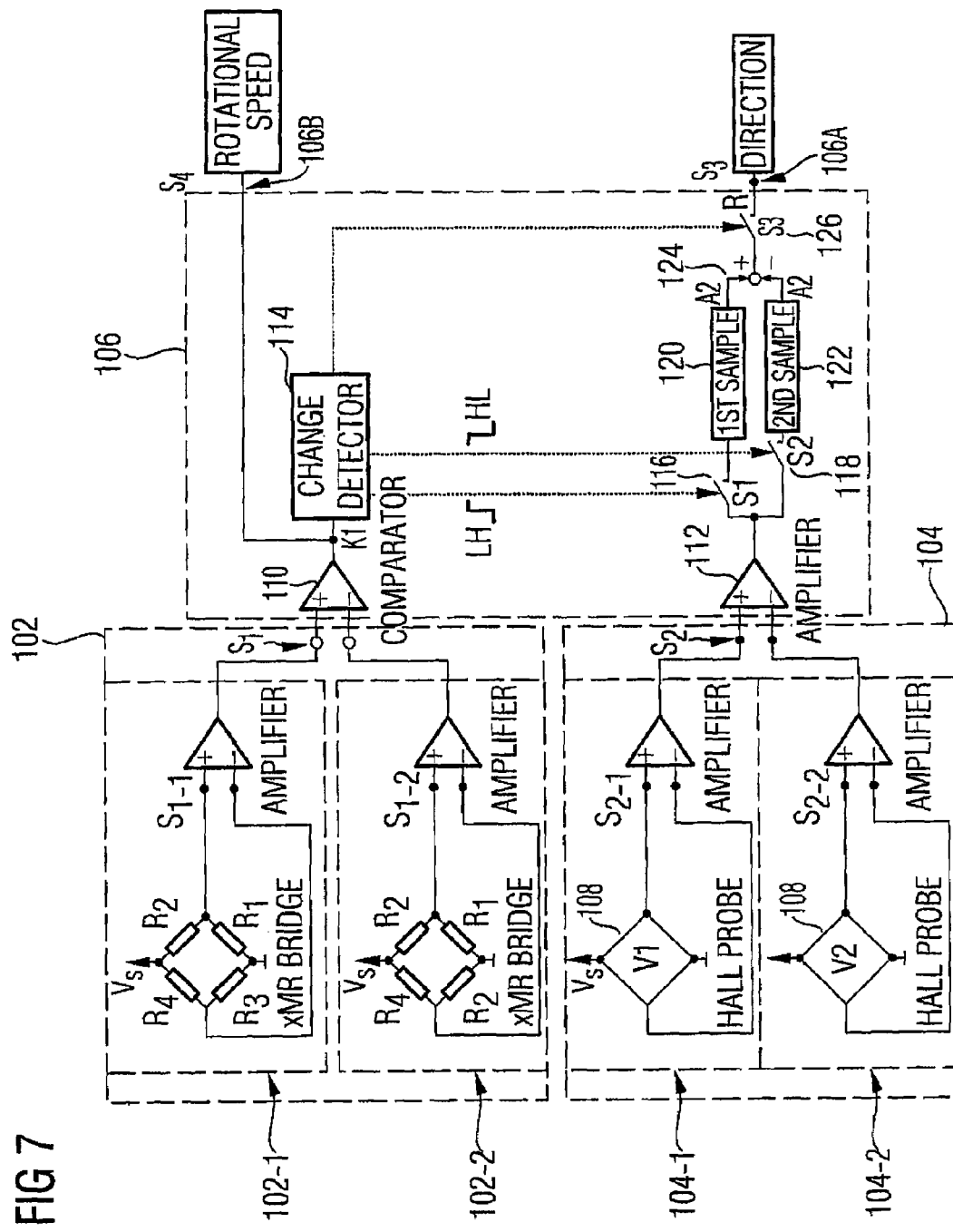

APPARATUS AND METHOD FOR THE DETERMINATION OF A DIRECTION OF AN OBJECT

PRIORITY

This application claims priority from German Patent Application No. 102004017191.2, which was filed on Apr. 07, 2004, and is incorporated herein by reference in its entirety.

TECHNICAL FIELD OF THE INVENTION

The present invention generally relates to an apparatus and a method for the determination of a relative direction of an object or indicator object or giver object, and in particular to the determination of a relative rotational direction or direction of movement of an indicator object, such as a rotating wheel, by means of magnetic field sensing elements arranged relative to the movement or rotational direction of the indicator object.

DESCRIPTION OF RELATED ART AND BACKGROUND OF THE INVENTION

In numerous applications, apart from rotational speed or velocity measurements of an indicator object, often also the recognition of the direction of movement or rotational direction of the indicator object, such as the rotational direction of a wheel or a shaft, is demanded. For this, in general, magnetic field sensors are used for the determination of the rotational speed and the rotational direction.

A first possibility known in the prior art for rotational direction and rotational speed determination now consists in using two magnetic field probes arranged spatially separated from each other and spaced to the indicator object to be examined. The sensor signals of the magnetic field sensors are evaluated separately here, with the movement or rotational direction of the indicator object being determined from the temporal sequence of the signals of the magnetic field sensors for example by means of (digital) signal processing means (DSP=digital signal processor) or microprocessors. In such an arrangement, it is required to use a so-called backbias magnet in connection with the indicator object, e.g. a gear, to generate a magnetic field influenced by the various teeth and depressions of the gear, so that the two spaced magnetic field sensors can provide different sensor signals depending on the rotational position of the gear.

In FIG. 9, a schematic illustration of such a Hall sensor arrangement 10 with two Hall elements 12, 14 and a backbias magnet 16 is exemplarily illustrated with reference to a gear (or gear rack) 18. The distance L (e.g. 2.5 mm) indicates the distance between the Hall sensor IC 10 (IC=integrated circuit) and the gear 18, the distance a indicates the mean distance of the Hall elements 12, 14, and the distance b indicates the distance of the Hall elements 12, 14 from the IC surface.

According to the arrangement of FIG. 9, the Hall sensor IC 10 senses the movement and position of a ferromagnetic structure in form of the gear 18 by sensing and temporally evaluating the respective flux density of a magnetic field penetrating the Hall elements 12, 14. For this, the so-called backbias magnet 16 with South and North Poles (as drawn) is arranged on the backside of the sensor means 10.

In this procedure known in the prior art for sensing the movement or rotational direction of an indicator object, it is, however, disadvantageous that a stationary background signal (backbias signal), such as the field of a permanent magnet, is not canceled in the rotational speed recognition by means of magnetic field sensors. In other words, this means that in this procedure a relatively small modulation signal or useful signal generated by the teeth of the gear in the background field of the permanent magnet has to be evaluated, so that the useful signal is overlaid by a great static background signal. Moreover, it is disadvantageous in this procedure that the synchronism (matching) of the two magnetic field sensor elements (12, 14) has to be very good so that the offset difference of the output waveforms of both magnetic field sensor elements 12, 14 becomes small, in order to obtain reasonable measurement results.

According to the arrangement of FIG. 9, the Hall sensor IC 10 thus senses the movement and position of a ferromagnetic structure in shape of the gear 18 by sensing and temporally evaluating the flux density of a magnetic field. For this, the so-called backbias magnet 16 with South and North Poles (as drawn) is arranged on the backside of the sensor means 10.

A further procedure according to the prior art for the determination of the rotational direction and the rotation velocity of an indicator object, which works with three magnetic field sensor elements, is presented, for example, in the German patent (DE 19717364 C1). As illustrated in this patent, the output signals of the three magnetic field sensor elements are linked with each other into a directional signal so that a static background signal is faded out, wherein the phase shift of the directional signal to a differential signal of the two outer magnetic field sensor elements is used for the direction recognition. Here, now the zero crossing of the differential signal is used as sample time instant of the directional signal, namely once at a rising differential signal and once at a falling differential signal. The difference of the two sampled directional signals now determines the movement direction of the indicator object. In this procedure illustrated in the above-referenced German patent it is now to be noted that only "ideal" tooth distances ("ideal pitches") are suitable for a sufficient performance of the sensor arrangement of three magnetic field sensor elements, because the evaluated directional signal becomes very small for greater tooth distances. It is spoken of "ideal pitches", when the tooth distance matches the probe distance.

The procedure illustrated in the above-mentioned German patent is particularly based on generating, from this combination of three output signals of the three magnetic field sensor elements, a directional signal having a phase shift of 90° ($\pi/2$) to the differential signal. The differential signal is formed by a subtraction of the signals of the two outer magnetic field sensor elements. The directional signal is formed by the subtraction of the sum of the two sensor signals forming the differential signal and the double signal value of the output signal of the center magnetic field sensor element. The reason for the desired phase shift of 90° consists in obtaining an as great as possible directional signal at the zero crossing of the differential signal. Thus, the rotational direction or movement direction of the indicator object can be determined from the sign of the directional signal, when the directional signal is sampled at each zero crossing of the differential signal.

With reference to the procedure known in the prior art for the determination of the rotational direction of an indicator object and in particular the two procedures previously illustrated, it should be noted that only the vertical magnetic field component, i.e. the magnetic field component perpendicular to the surface of the magnetic field sensor with the sensor elements, is used or taken into account there.

With reference to the previously illustrated procedures according to the prior art for the determination of the rotational direction of an indicator object, it is also to be noted that, in the sensor arrangements used there, on the one hand the synchronism of the used magnetic field sensor elements has to be extremely good so that the offset differences of the magnetic field sensor elements are as small as possible, and also the positioning of the magnetic field sensor elements with reference to the indicator object the rotational direction of which is to be determined has to be made in an extremely exact manner, because otherwise too great and thus spurious phase errors, jitters, etc. occur in the output signal of this sensor arrangement.

The mean distance a (c.f. FIG. 9) of the sensor elements, according to the prior art, is to be adjusted so that the transitions or edges between the teeth (protruding portions) and the depressions or gaps (recessed portions) of the gear are sensed by the two sensor elements in succession in overlapping manner. With this, in a difference formation of the waveforms of the output signals of the two sensor elements, such a resulting differential signal may be obtained, which comprises signal peaks, when a tooth-gap-edge is moved past the sensor elements. The evaluation of this differential signal may however by very intensive due to overshoots in the waveform, because the output signal of the sensor elements is preferably to be processed further and rendered so that the course of the output signal substantially reproduces the profile of the indicator gear. Furthermore, in the previously used sensor arrangements, positioning inaccuracies between the indicator object and the sensor means impede the accurate evaluation of the sensor signal and cause phase noise, jitter, etc. in the sensor output signal.

Hence, it becomes obvious from the above-mentioned prior art that the evaluation of the sensor signals of the magnetic field sensor elements for the determination of the rotational direction of the indicator object is relatively intensive and also the determination of the velocity, the rotational angle or the rotational direction is not always sufficiently accurate.

SUMMARY OF THE INVENTION

Starting from this prior art, it is an object of the present invention to provide an improved concept for the determination of the relative direction of an indicator object, this concept being particularly insensitive to positioning tolerances of the magnetic field sensor elements and insensitive to the influence of interference fields on the magnetic field sensor elements and thus on the determination of the relative direction.

In accordance with a first aspect, the present invention provides an apparatus for the determination of a momentary relative direction of an indicator object depending on a magnetic field influenced or generated by the indicator object, having a first sensor for sensing a course of a first magnetic field component of the magnetic field; a second sensor for sensing a course of a second magnetic field component of the magnetic field; and an evaluator for evaluating the course of the first magnetic field component and the second magnetic field component in order to determine the momentary, relative direction of the indicator object, the first magnetic field component and the second magnetic field component being offset in angle with respect to each other.

In accordance with a second aspect, the present invention provides a method of determining a momentary, relative direction of an indicator object depending on a magnetic field influenced or generated by the indicator object, with the steps of sensing a course of a first magnetic field component; sensing a course of a second magnetic field component; and evaluating the course of the first magnetic field component and the second magnetic field component in order to determine the momentary, relative direction of the indicator object, the first magnetic field component and the second magnetic field component being offset in angle with respect to each other.

In accordance with a third aspect, the present invention provides a computer program with a program code for performing, when the computer program is executed on a computer, the method of determining a momentary, relative direction of an indicator object depending on a magnetic field influenced or generated by the indicator object, with the steps of sensing a course of a first magnetic field component; sensing a course of a second magnetic field component; and evaluating the course of the first magnetic field component and the second magnetic field component in order to determine the momentary, relative direction of the indicator object, the first magnetic field component and the second magnetic field component being offset in angle with respect to each other.

The inventive apparatus for the determination of a momentary relative direction of an indicator object depending on a magnetic field influenced or generated by the indicator object includes first means for sensing a course of a first magnetic field component of the magnetic field, second means for sensing a course of a second magnetic field component of the magnetic field, and means for evaluating the course of the first magnetic field component and the second magnetic field component to determine the momentary relative direction of the indicator object, the first magnetic field component and the second magnetic field component being offset in angle with respect to each other.

In the inventive method of determining a momentary relative direction of an indicator object depending on a magnetic field influenced or generated by the indicator object, a course of a first magnetic field component ($H_x$) and a course of a second magnetic field component ($H_y$) is sensed. Then the courses of the first magnetic field component ($H_x$) and the second magnetic field component ($H_y$) are evaluated to determine the momentary relative direction of the indicator object, the first magnetic field component ($H_x$) and the second magnetic field component ($H_y$) being offset in angle with respect to each other.

According to the inventive method, in particular when evaluating the course of the first magnetic field component and the second magnetic field component, a reversal point, and in particular a zero crossing, of one of the courses of the magnetic field components and the direction of the waveform in the reversal point is determined, whereupon the momentary value, and in particular the sign, of the other course of the magnetic field component is checked, with each momentary value (sign) with reference to the course of the magnetic field component sampled in the reversal point being fixedly associated with a rotational direction.

Furthermore, according to the invention, it is taken advantage of the fact that the course of the first magnetic field component is phase-shifted to the course of the second magnetic field component by 90° ($\pi/2$).

The present invention is based on the finding of sensing the course of a first magnetic field component and a second magnetic field component that are offset in angle with respect to each other and preferably substantially perpendicular, with two magnetic field sensor means that are preferably arranged immediately adjacent to each other, whereby the first and second evaluation signals obtained by the first magnetic field sensing means and by the second magnetic field sensing means are offset with respect to each other by a corresponding phase angle, and in particular a phase angle of 90°, so that by means of these two evaluation signals phase-shifted by a given phase angle, and in particular by 90°, both the relative velocity and the relative direction of the indicator object with reference to the sensing means may be determined.

According to the present invention, it is possible, by means of two different magnetic field sensor elements that are sensitive with reference to two different magnetic field components and that are preferably arranged immediately adjacent to each other, to sense different magnetic field components, i.e. preferably a horizontal and a vertical magnetic field component with reference to the indicator object plane, substantially in one point, and to generate, depending on the two different magnetic field components, two evaluation signals that are phase-shifted with respect to each other, and preferably 90° phase-shifted, wherein particularly these two evaluation signals comprise information on the relative velocity (e.g. relative rotation velocity) and/or the relative direction (e.g. relative rotational direction) of the indicator object with reference to the magnetic field sensor elements and can be evaluated correspondingly.

According to the present invention it is now taken advantage of the fact that in the two components of the magnetic field, both in a backbias arrangement and in a pole wheel application, the extreme values (maxima and minima) of the vertical magnetic field component of the magnetic field, viewed locally with reference to the indicator object plane, always lie where the horizontal field component of the magnetic field has its reversal points or zero crossings.

According to the present invention, it is now possible to determine the reversal points or zero crossings of the course of the first magnetic field component (e.g. in form of the first evaluation signal) and the direction of the waveforms in the reversal points, with the course of the second magnetic field component (e.g. in form of the second evaluation signal) being examined depending on the phase location of the determined reversal points or zero crossings and their direction of the first evaluation signal.

From the obtained information, i.e. the reversal points and directions of the waveform of the first evaluation signal there and the momentary values or signs of the waveform of the second evaluation signal, then the rotational direction of the indicator object can be determined, because the rotational direction of the indicator object can be fixedly associated with this information of the first and second evaluation signals.

According to a preferred embodiment of the present invention, two varied magnetic field sensing elements are used, which are preferably arranged immediately adjacent to each other, wherein one magnetic field sensor element is sensitive with reference to the vertical magnetic field component and the second magnetic field sensing element is sensitive with reference to the horizontal magnetic field component, so that for example the movement or rotational direction of an indicator object may be determined by measuring or sampling the vertical field component in two successive zero crossings of the horizontal field component, and these two values being subtracted from each other. The sign of the momentary value of this difference now represents the movement or rotational direction of the indicator object.

According to a further embodiment of the present invention, also a differential embodiment of the two different magnetic field sensor elements may be used, with two magnetic field sensor elements of the same type each being arranged on an integrated semiconductor chip at the distance of the pitch, i.e. at the distance of the teeth in a backbias arrangement or at the distance of the pole pairs in a pole wheel application. The two different sensor elements are again preferably arranged immediately adjacent to each other. The difference is now formed and evaluated each from the waveforms of the two magnetic field sensor elements of one type.

But this further inventive arrangement does not substantially change the conditions, i.e. phase locations, of the respective signals formed of the vertical magnetic field component and the horizontal magnetic field component. Hence, the evaluation may take place, as this has already been described previously, wherein in this further inventive procedure, however, it is extremely advantageous that doubling of the waveforms of the evaluation signals is achieved, and also that the waveform generated from the vertical field component is freed from the offset. Thereby, the two differential signals obtained from the vertical and horizontal magnetic field components are equivalent also in a backbias arrangement and may be interchanged in their functions.

BRIEF DESCRIPTION OF THE DRAWINGS

These and other objects and features of the present invention will become clear from the following description taken in conjunction with the accompanying drawings, in which:

FIG. 1 shows an apparatus for the determination of a momentary relative direction of an indicator object according to a first embodiment of the present invention;

FIGS. 6a-f show the obtained waveforms in the evaluation of velocity and direction of an indicator object with the circuitry according to the present invention;

FIG. 7 shows a further possible embodiment of a circuitry for the evaluation of the velocity and direction of an indicator object by means of a differential arrangement of the magnetic field sensing means according to the present invention;

DETAILED DESCRIPTION OF THE PREFERRED EMBODIMENTS

With reference to FIGS. 1, 2a-b, 3, now a first inventive embodiment of an apparatus 100 for the determination of a momentary relative direction of an indicator object is described. Generally, each item of ferromagnetic or permanent magnetic material influencing the present magnetic field in its environment or generating a corresponding magnetic field is to be regarded as indicator object.

According to the present invention, it is further to be noted that the inventive apparatus and the inventive method for the determination of a direction of an indicator object can be preferably employed in applications in which a magnetic field is used for the detection of velocity or rotational speed and direction or rotational directions of an indicator object. According to the invention, so-called gears or gear racks may thus be employed as indicator objects in connection with a backbias magnet, with the backbbias magnet generating a background magnetic field defined or influenced by the gear arrangement, i.e. protruding teeth and recessed depressions (gaps), wherein the distance of the teeth is referred to as a so-called "pitch" distance in this so-called backbias arrangements of gears or gear racks.

It is to be noted that the present invention is equally applicable to so-called pole wheel applications, such as pole wheels or pole bars with magnetized poles, whereby pole wheels or pole bars represent magnetic North and South Poles of a periodic permanently magnetized structure arranged next to each other. In proximity to the surface of the pole wheel, the field lines of the magnetic field (in air) pass directly from the magnetic North Pole to the magnetic South Pole of the pole wheel structure. The differently permanently magnetized areas are usually equally large, wherein in this case the distance of the pole pairs in a pole wheel application is referred to as so-called "pitch" distance.

Figure 2A:
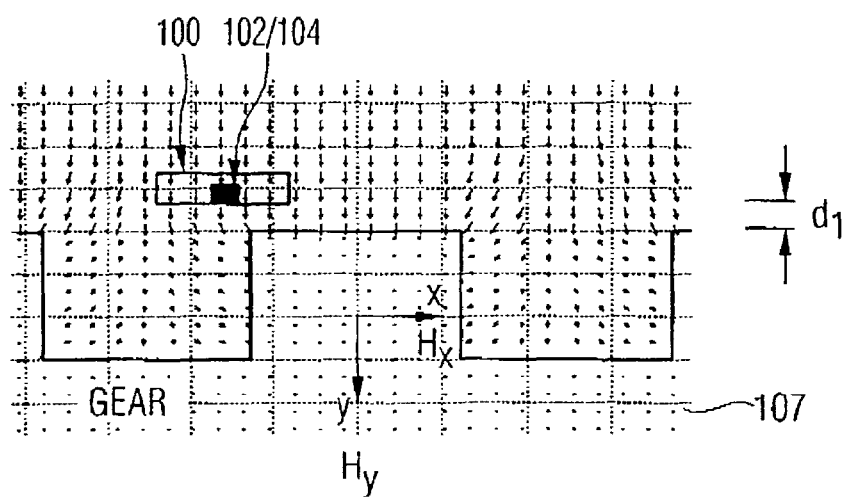
FIGS. 2a-b show exemplary courses of the magnetic field lines with reference to a gear with the use of a backbias magnet and the corresponding courses of the magnetic field strength components.
Figure 2B:
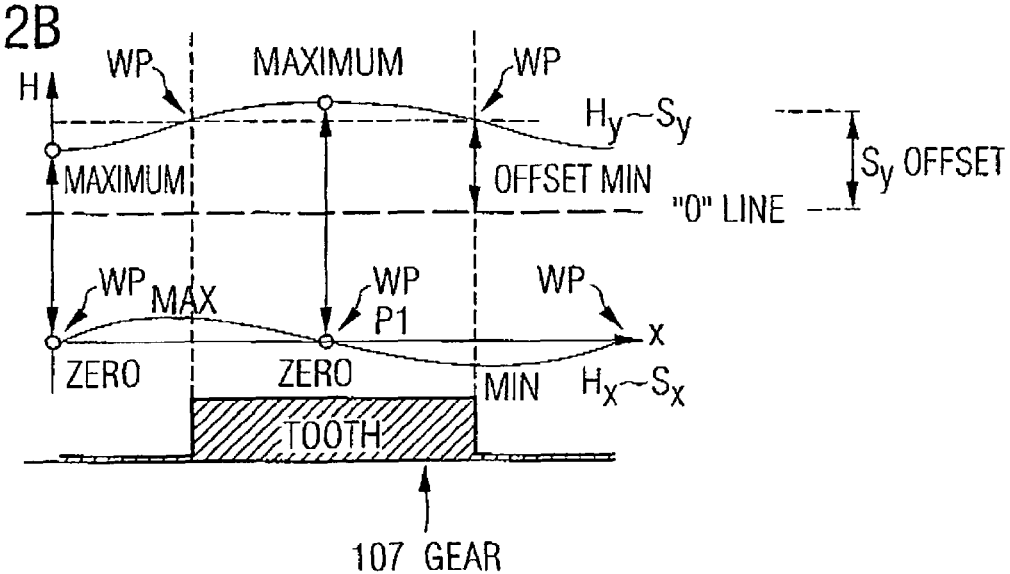
Figure 3:
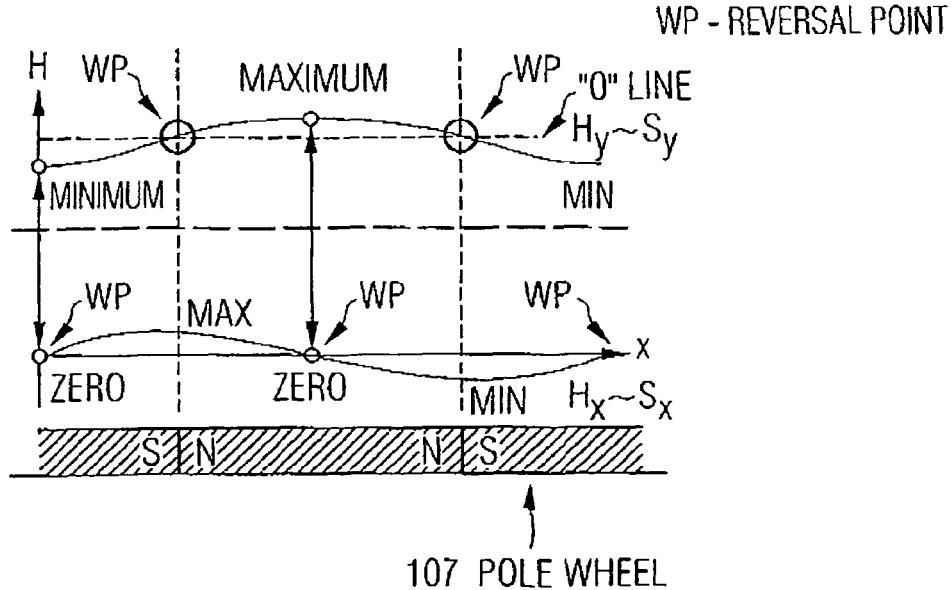
FIG. 3 shows exemplary courses of the vertical and horizontal magnetic field components with the use of a pole wheel.

The following description, and in particular the illustrations in FIGS. 2a-b, 3, are illustrated purely exemplarily with reference to a gear or gear rack arrangement with periodically successive teeth and depressions, wherein the present invention is equally applicable to the above-illustrated pole wheel or pole bar applications or corresponding arrangements, with which corresponding magnetic fields or corresponding magnetic field components may be generated.

As illustrated in FIG. 1, the inventive apparatus 100 for the determination of a momentary relative direction of an indicator object includes a first magnetic field sensing means 102 providing a first evaluation signal at its output 102a as an output signal S1 depending on the determined course of a first magnetic field component $H_x$, and also a second magnetic field sensing means 104 for sensing a second magnetic field component $H_y$, the second sensing means 104 providing an output signal S2 in form of a second evaluation signal at an output 104a. The inventive apparatus 100 further includes an evaluation means 106 for evaluating the first and second evaluation signals S1 and S2, which reproduce the course of the first magnetic field component and the second magnetic field component in the region of the first and second magnetic field sensing means, in order to output an output signal S3 containing information on the direction of an indicator object 107 at a first output 106a, and optionally output a further output signal S4 comprising information on the velocity (or rotational speed etc.) of the indicator object at a further output 106b.

With reference to FIG. 1, it is to be noted that the illustration shown there does not give any geometric relations between the individual elements shown, but it is only to convey functional connections according to the inventive apparatus 100.

In the following, with reference to the FIGS. 2a-b, 3, now the functioning of the apparatus 100 for the determination of a momentary relative direction of an indicator object illustrated in FIG. 1 is illustrated, wherein the determination is made depending on a magnetic field influenced or generated by the indicator object.

In the present invention, it is now taken advantage of the fact that in applications in which a magnetic field H is used for the detection of the velocity or rotational speed and the direction or rotational direction of an indicator object, such as a gear, a gear rack, a pole wheel, a pole bar, the components of the magnetic field H generated or influenced by the indicator object in the indicator object plane (plan view or drawing plane in FIG. 2a) and perpendicular to the relative movement direction of the indicator object, which will be referred to as x component or horizontal component $H_x$ of the magnetic field in the following, and the component of the magnetic field perpendicular to the relative movement direction and parallel to this indicator object plane, which will be referred to as y component or vertical component $H_y$ of the magnetic field in the following, have the property that the course of the vertical component $H_y$ of the magnetic field in the object plane (with reference to the surface of the indicator object 107) has its extreme values, i.e. maxima or minima, where the course of the horizontal component $H_x$ of the magnetic field has its reversal points or zero crossings.

FIG. 2a, for example, shows the course of the magnetic field lines across a cutout of a gear 107, i.e. with reference to several teeth and gaps of the gear, with the use of a backbias magnet (background magnet), wherein FIG. 2b exemplarily illustrates the course of the magnetic field components of the magnetic field in the vertical direction "y" as course $H_y$, and in the horizontal direction "x" as the course $H_x$.

The horizontal direction "x" is parallel to the movement direction (or tangent of the movement direction) of the indicator object, the vertical direction being perpendicular to the movement direction of the indicator object and parallel to the indicator object plane (drawing plane of FIG. 2a). In principle, the courses of FIG. 2b also remain valid with the use of a pole wheel or a pole bar, i.e. a wheel or a bar with alternating North-South magnetization at the perimeter or with reference to the length. A substantial difference in the use of a pole wheel or a pole bar, however, consists in the course $H_y$ of the vertical component of the magnetic field not having an offset, but being symmetrical to the zero line like the course $H_x$ of the horizontal component of the magnetic field, as this is exemplarily illustrated in FIG. 3. Thereby, also the course $H_y$ of the vertical component has zero crossings at the position of its reversal points.

Thus, according to the present invention, it can be noted in summary with reference to the horizontal and vertical magnetic field components $H_x$, $H_y$ that the course of the horizontal component $H_x$ and the vertical component $H_y$ of the magnetic field always has its extreme values i.e. maxima and minima, where the course of the respective other component of the magnetic field has its reversal points and preferably also its zero crossings.

As it is illustrated in FIG. 2a, the first and second sensing means 102, 104 are arranged substantially perpendicular to the relative direction of the indicator object (x direction in FIG. 2a) spaced at a given distance $d_1$ from the indicator object 107. The distance $d_1$ should be as small as possible and be kept constant in order to guarantee high measurement accuracy.

Typical orders of magnitude for the distance $d_1$, depending on case of application, for example range from 0.1 mm to 5 mm, and preferably from 0.5-2 mm. Typical field strengths of the occurring magnetic fields, depending on the indicator magnet used and its distance from the sensing elements, for example range from 200 µT to 200 mT. Typical field strengths of the indicator magnet range for example from 200 to 500 mT.

The first and second sensing means 102, 104 are arranged on a support, such as a semiconductor substrate, so that for example the first sensing means 102 can sense the course of the horizontal component $H_x$ of the magnetic field and the second sensing means 104 the course of the vertical component $H_y$ of the magnetic field influenced or generated by the indicator object 107, in order to generate first and second evaluation signals $S_1$, $S_2$. According to definition, it is now assumed for the following description that the first magnetic field component as the course $H_x$ of the horizontal component of the magnetic field passes substantially parallel to the relative direction of the indicator object 107, wherein the second magnetic field component as course $H_y$ passes substantially perpendicularly to the relative direction of the indicator object 107 and in direction of the first and second sensing means. With reference to the present invention, it should be noted that it is only important that the first and second magnetic field sensing means 102, 104 can sense different (angularly offset) magnetic field components each.

For the sensed course $H_x$ of the horizontal magnetic field component and the sensed course $H_y$ of the vertical magnetic field component to be able to be related in simple manner, the first and second magnetic field sensing means are arranged immediately next to each other or on top of each other with reference to the relative direction of the indicator object. Furthermore, it should be noted that the horizontal expansion of the first and/or second sensing means 102, 104 with reference to a "pitch" of a gear or pole wheel is relatively small, i.e. should be preferably less than 20% of the pitch length. Furthermore, it should be noted that if the first and second magnetic field sensing means 102, 104 are arranged next to each other, the center distance of the two magnetic field sensing means should preferably be less than 20% of the pitch length. If the first and second sensing means 102, 104 are arranged on top of each other, their vertical distance with reference to the sensing plane of the two magnetic field sensing means should in practice not exceed a given value, which is for example smaller than 10% of the pitch length. Here, of course also the distance $d_1$ between indicator object and sensing means is to be taken into account.

For sufficient measurement accuracy, it may thus be assumed that the first and second magnetic field sensing means 102, 104 are arranged in one point with reference to the magnetic field of the indicator object 107 to be examined.

As has already been indicated above, the indicator object 107 the direction of which and optionally also the velocity of which is to be determined, may be embodied in form of a gear or a gear rack with a backbias magnet, with the gear or the gear rack comprising a plurality of teeth and depressions that are arranged alternately, in order to influence the magnetic field of the backbias magnet. Furthermore, it is possible that the indicator object is formed as a pole wheel or a pole bar, with the magnetic poles being arranged alternately next to each other and generating the magnetic field to be examined. The relative direction of the indicator object 107 is now the relative movement direction or rotational direction of the indicator object 107 relative to the first and second sensing means, with the relative velocity being the relative movement velocity or longitudinal velocity, or rotational speed or rotation velocity of the indicator object 107 relative to the first and second sensing means 102, 104. Referring to the present invention, it should be noted that relative movement or direction means that either the indicator object 107 may be moved with reference to the sensing means 102, 104, or also the sensing means 102, 104 with reference to the indicator object 107.

With reference to the inventive apparatus for the determination of a momentary relative direction of an indicator object 107 depending on a magnetic field influenced or generated by the indicator object 107 illustrated in FIG. 1, it is now gone into the evaluation of the first and second evaluation signals S1 ($S_x$) and S2 ($S_y$) of the first and second magnetic field sensing means 102, 104.

For further explanation, now in FIGS. 2b, 3 the first and second evaluation signals $S_x$ and $S_y$ are exemplarily, schematically plotted versus the time axis, wherein sinusoidal courses of the evaluation signals $S_x$ and $S_y$ may substantially be assumed. The diagram illustrated in FIG. 2b refers to the use of a gear with a backbias magnet arrangement, so that the course of the evaluation signal $S_y$ is offset by the background magnetic field of the backbias magnet by an offset value $S_{y\text{-}offset}$, whereas the waveform of the evaluation signal $S_x$ at the same time comprises zero crossings in its reversal points.

In the courses of the two evaluation signals $S_x$ and $S_y$ illustrated in FIG. 3, a pole wheel arrangement was used, so that also the evaluation signal $S_y$, which is proportional to the course $H_y$ of the vertical component of the magnetic field, in principle also always comprises a zero crossing in its reversal points.

From the principle courses of the evaluation signals $S_x$, $S_y$ for gear arrangements or pole wheel arrangements illustrated above in FIGS. 2b and 3, now the direction of the indicator object may be determined by performing the assessment of the evaluation signals $S_x$, $S_y$ explained in the following.

In order to determine the direction of the indicator object 107, according to the invention, a reversal point in the course of one of the evaluation signals $S_x$, $S_y$ and the accompanying direction of passing the reversal point of this evaluation signal are determined. Then the momentary value or the sign of the respective other evaluation signal is checked depending on the determined phase location of the reversal point, with a rotational direction of the indicator object each being able to be fixedly associated with each momentary value of the other evaluation signal, which was determined depending on the phase location of the reversal point, taking the signal direction in the reversal point into account.

From FIGS. 2b, 3, it becomes apparent that the first and second evaluation signals $S_x$ and $S_y$ are phase-shifted by 90° ($\pi/2$) with respect to each other.

Now starting from FIG. 2b illustrating the evaluation signals $S_x$, $S_y$ in a gear arrangement with a backbias magnet in principle, now for example starting from the waveform of the evaluation signal $S_x$, the reversal point P1 may be determined with the slope or direction in the reversal point, wherein now the rotational direction of the gear may be determined with the accompanying momentary value of the course of the evaluation signal $S_y$.

The determination of the indicator object may also be made starting from the evaluation signal $S_y$ by determining a reversal point and the slope or direction of the course of the evaluation signal in this reversal point and further assessing the momentary value of the course of the evaluation signal $S_x$.

It is particularly advantageous when both evaluation signals have their reversal points in zero crossings of the course of the evaluation signals $S_x$, $S_y$, as this is illustrated in FIG. 3, which illustrates the evaluation by means of a pole wheel arrangement. In this arrangement, the reversal points of both the first and second evaluation signals correspond to the zero crossings of the course of the first and second evaluation signals $S_x$, $S_y$.

Thereby, a determination of the reversal points of the evaluation signals and the corresponding direction (slope) in these reversal points (zero crossings) may be performed even more easily.

According to the present invention, first and second magnetic field sensing means are used, which are sensitive with reference to first and second magnetic field components of the magnetic field of an indicator object to be examined, the relative movement direction or relative movement velocity of which is to be determined. Thus, the first magnetic field sensing means 102 is embodied to sense the horizontal component $H_x$ of the magnetic field, whereas the second magnetic field sensing means 104 is embodied to sense the vertical component $H_y$ of the magnetic field, so that two evaluation signals $S_1$ (=$S_x$) and $S_2$ (=$S_y$) may be obtained, which are phase shifted by substantially 90° with respect to each other and contain the relevant information to be able to determine the movement direction or rotation direction and the movement velocity or rotation velocity of the indicator object 107.

For the measurement of the horizontal or vertical components $H_x$, $H_y$ of the magnetic field $H_x$ for example all lateral or vertical Hall probes, all xMR sensors (AMR, GMR, TMR, CMR sensors; AMR=anisotropic magnetoresistance, GMR=giant magnetoresistance, TMR=tunnel magnetoresistance, CMR=colossal magnetoresistance), magnetoresistors, magnetotranisators (MAGFETs), giant planar Hall-effect sensors, spin transistors, GMI (GMI=giant magnetic impedance) elements, or magnetodiodes can be arranged and employed correspondingly. It should be noted, however, that the above enumeration is not comprehensive, wherein with reference to the present invention substantially all magnetic field-sensitive elements can be employed.

Preferably, for the measurement of the horizontal components $H_x$ of the magnetic field, vertical Hall probes, xMR sensors, giant planar Hall-effect sensors, spin transistors, or GMI elements will be employed. For sensing the vertical component $H_y$ of the magnetic field, preferably lateral Hall probes, magnetoresistors, magnetotransistors (MAGFETs), or magnetodiodes are employed.

With reference to the present invention; however, it should become obvious that the first and second sensing means 102, 104 should only be able to sense the different components $H_x$, $H_y$ of the magnetic field to be examined, with the respective embodiment of the magnetic field sensing means not being important for the present invention. It is only important that different components, and preferably the 90° angularly offset components, as they are illustrated in FIG. 2a with reference to the drawing plane, of the magnetic field can be sensed by the magnetic field sensor elements 102, 104.

Figure 4:
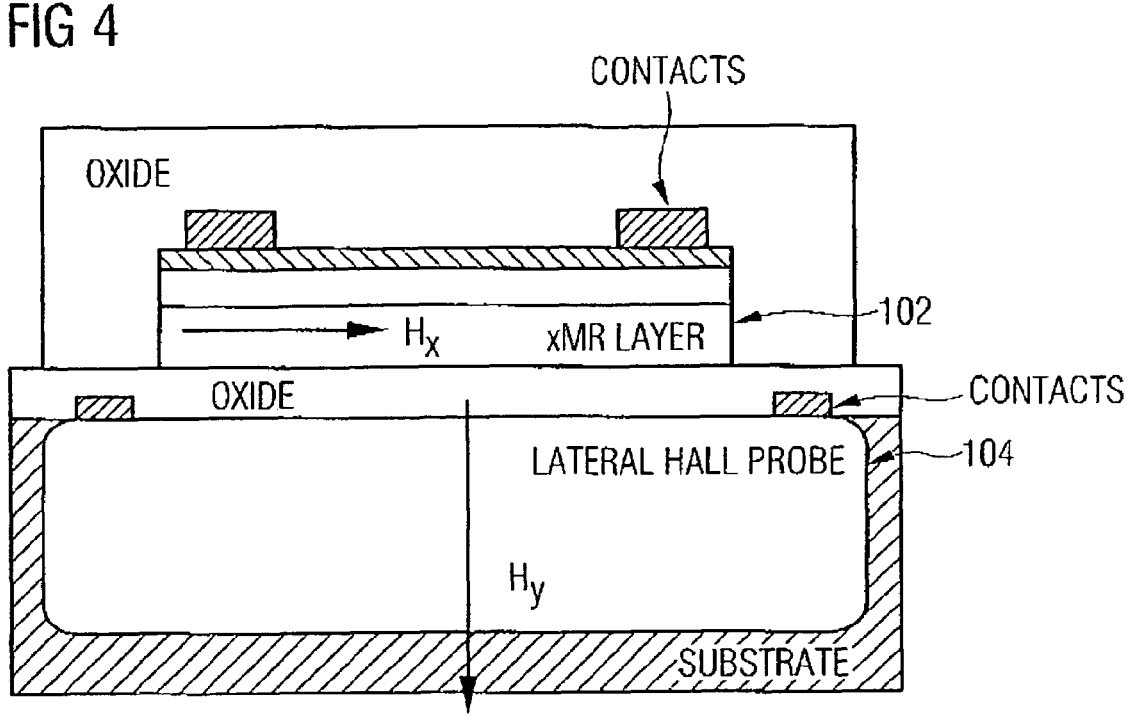
FIG. 4 shows a possible realization of a sensing means for sensing first and second magnetic field components according to the present invention.

A very simple example for first and second magnetic field sensing means 102, 104 arranged immediately adjacent to each other, and in particular on top of each other, is exemplarily illustrated in FIG. 4, wherein a lateral Hall probe 104 is positioned in the middle of an integrated semiconductor sensor IC, with an xMR sensor 102 being formed above the lateral Hall probe for example by means of deposition. The arrangement illustrated in FIG. 4 can be produced relatively easily with usual semiconductor production steps.

For example, the active n type semiconductor region of the Hall probe 104 may be produced by means of implantation in a p type semiconductor substrate and further be provided with contact pads, whereupon the xMR layer 102 of a magnetoresistive material is applied on a deposited oxide layer for example by means of sputtering and provided with contact terminals.

In the following, now referring to FIGS. 5 and 6, a possible realization of the inventive apparatus 100 for the determination of a momentary, relative movement of an indicator object (not shown in FIG. 5) depending on a magnetic field influenced or generated by the indicator object will be explained in detail.

In the following description of this embodiment according to the present invention, again the same reference numerals are used for corresponding circuit elements with reference to the previous description, with a renewed detailed description of these circuit elements being omitted in the following.

Figure 5:
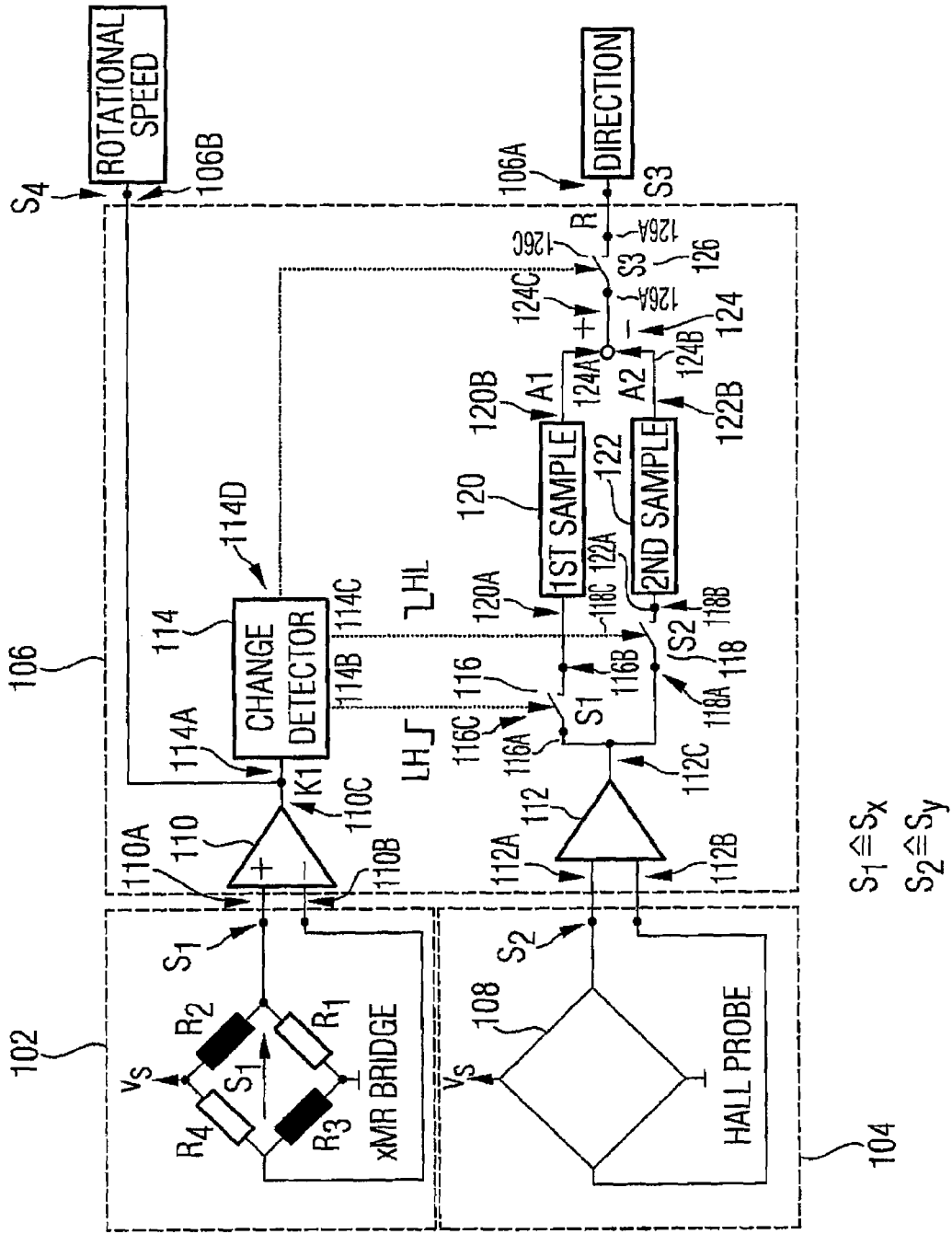
FIG. 5 shows a principle illustration of a circuitry for the evaluation of velocity and direction of an indicator object according to the present invention.

The circuitry 100 shown in FIG. 5 in form of a principle circuit diagram for the evaluation of the directions and optionally the velocity of an indicator object again includes first magnetic field sensing means 102 for sensing a course of a first magnetic field component $H_x$ and further second magnetic field sensing means 104 for sensing the course of a second magnetic field component $H_y$. Furthermore, the arrangement of FIG. 5 comprises means 106 for evaluating the course of the first magnetic field component $H_y$ and the second magnetic field component $H_x$, with means 106 preferably providing an output signal S3 comprising information with reference to the direction of the indicator object and optionally an output signal $S_4$ containing information on the velocity of the indicator object.

As illustrated in FIG. 5, the first magnetic field sensing means 102 for sensing the course $H_x$ of the horizontal component of the magnetic field is formed as a bridge circuit (Wheatstone bridge) with four resistors $R_1$-$R_4$, which form a voltage splitter pair by pair and lie at the bridge feed voltage $V_s$. The resistors $R_2$ and $R_3$ of the bridge circuit are formed as resistance elements from a magnetoresistive material (xMR elements), so that this bridge circuit will be referred to as xMR bridge circuit in the following. The bridge diagonal voltage serves as the output signal $S_1$ (evaluation signal) of the first magnetic field sensing means 102 in this embodiment of the present invention. The second magnetic field sensing means 102 provided for sensing the course $H_y$ of the vertical component of the magnetic field is formed as a lateral Hall probe 108, wherein the supply voltage $V_s$ is present between control terminals of the Hall probe, and the output signal $S_2$ (evaluation signal $S_y$) is provided at the output terminals of the Hall probe.

According to the circuitry 100 of FIG. 5, the evaluation means 106 includes a comparator means 110 with a first input terminal 110a (positive input) and a second input terminal 110b (negative input), and an output terminal 110c, an amplifier means 112 with a first input terminal 112a (positive input), a second input terminal 112b (negative input), and an output terminal 112c, a change detector 114 (waveform evaluation means) with a first input 114a and first to third output terminals 114b-d, a first switch means 116 with an input terminal 116a, an output terminal 116b, and a control terminal 116c, a second switch means 118 with an input terminal 118a, an output terminal 118b, and a control terminal 118c, a first memory means 120 with an input terminal 120a and an output terminal 120b, a second memory means 122 with a first terminal 122a and a second terminal 122b, a combination means 124 with a first input terminal 124a, a second input terminal 124b, and an output terminal 124c, a third switch means 126 with an input terminal 126a, an output terminal 126b, and a control terminal 126c. The evaluation means 106 further includes an output terminal 106a for providing a signal $S_3$ including information with reference to the direction of the indicator object 107, and further optionally an output terminal 106b at which an output signal $S_4$ may be provided, which contains information on the velocity of the indicator object 107.

As illustrated in FIG. 5, the evaluation signal $S_1$ ($S_x$) of the first magnetic field sensing means 102 is provided to the comparator means 110 on the input side, which is preferably formed as a zero point comparator, wherein the comparator means 110 is connected to the output terminal 106b and the input terminal 114a of the change detector 114 on the output side. The evaluation signal $S_2$ ($S_y$) of the second magnetic field sensing means 104 in form of the Hall probe 108 is provided to the amplifier 112 on the input side, wherein the output terminal 112c of the amplifier means 112 is connected to the input terminal 116a of the first switch means and the input terminal 118a of the second switch means 118. The first and second output terminals 114b, 114c of the change detector 114 are connected to the control terminal 116c and the control terminal 118c of the first switch means 116 and the second switch means 118, respectively.

The output terminal 116b of the first switch means is connected to the input terminal 120a of the first sample memory means 120, wherein the output terminal 118b of the second switch means 118 is connected to the input terminal 122a of the second sample memory means. The output terminal 120b and the output terminal 122b of the first and second sample memory means 120, 122, respectively, are connected to the input terminals 122a and 122b of the combination means 124, respectively, and provide the signal values $A_1$ and $A_2$, respectively. The output terminal 124c of the combination means 124 is connected to the input terminal 126a of the third switch means 126, wherein the control terminal 126c of the third switch means 126 is connected to the output terminal 114d of the change detector 114. The output terminal 126b of the third switch means 126 is connected to the output terminal 106a of the evaluation means 100, in order to provide the output signal $S_3$ containing information on the direction of the indicator object.

In FIGS. 6a-f, some significant waveforms of the circuitry 100 illustrated in FIG. 5 are exemplarily illustrated.

The waveform $S_y$ (FIG. 6a) reproduces the output signal of the second magnetic field sensing means 104. The waveform $S_x$ (FIG. 6b) reproduces the output signal of the first magnetic field sensing means 102. The waveform $K_1$ (FIG. 6c) reproduces the output signal of the comparator means 110. The waveforms $A_1$ and $A_2$ (FIGS. 6d-e) reproduce the samples stored in the sample memory means 120, 122 versus time. The waveform R (FIG. 6f) reproduces the signal at the output terminal 106a of the evaluation means.

In the following, now the functioning of the circuitry 100 illustrated in FIG. 5 will be explained in connection with the waveforms illustrated in FIGS. 6a-f in a right-hand motion of a gear or a gear rack.

As illustrated in FIG. 5, the first magnetic field sensing means 102 is preferably formed as a bridge circuit $R_1$-$R_4$, wherein two magnetoresistive elements $R_2$, $R_3$ are provided to sense the horizontal component $H_x$ of the magnetic field. With reference to the present invention, it should be obvious that substantially any magnetic field sensing means can be employed for sensing the horizontal magnetic field component, wherein in the simplest case a single magnetoresistive element may be used.

The xMR bridge circuit, which is preferably arranged in the middle of an integrated semiconductor chip, provides the output signal $S_x$, the course (voltage course) of which is illustrated in FIG. 6 versus the time t. The evaluation signal $S_x$ is evaluated with the comparator means 110, which is preferably formed as zero point comparator, as already indicated, whereby the output signal $K_1$ of the comparator means 110 is obtained. The output signal $K_1$ comprises a rectangular function, wherein the output signal $K_1$ comprises a logically high value "H" when the waveform $S_x$ is positive, and a low logic level "L" when the waveform of the evaluation signal $S_x$ is negative. Thus, the output signal of the comparator means 110 may be employed for setting the sample time instants for the evaluation signal $S_y$ (directional signal), wherein the logic transitions of the output signal $K_1$ correspond to the zero crossings (or reversal points) of the first evaluation signal $S_x$. Furthermore, the output signal $K_1$ may also be used as a so-called rotational speed signal for the determination of the velocity of the indicator object, since all unidirectional logic transitions of the output signal $K_1$ represent a period length (pitch length) of the gear (the gear rack).

The change detector 114 now recognizes whether the output signal $K_1$ of the comparator means 110 transitions from a low logic level L to a high logic level H (LH transition) or from a high logic level H to a logic level L (HL transition). In a transition from a logic level L to a high logic level H, the change detector 114 activates the first switch means 116 (sample switch $S_1$) at the time instant $t_1$ (or at the time instant $t_3$), so that the first switch is connected through at this time.

In a logic transition from a high logic level H to a low logic level L (HL transition) at the time instant $t_2$, the second switch means 118 (sample switch $S_2$) is activated, i.e. the switch means 118 is connected through.

Here, the sampled directional signals $A_1$ and $A_2$ come from the amplifier means 112 preferably amplifying the evaluation signal $S_y$ of the Hall probe 108, so that the sample A1 is stored in the first memory means 120 and the sample $A_2$ is stored in the second memory means 122.

These two signal values $A_1$ ($=S_{dy1}$) and $A_2$ ($S_{dy2}$) may be stored or latched in the first and second sample memory means 120, 122 in analog or digital form. The stored samples $A_1$ and $A_2$ are provided to the combination means 124 combining and preferably subtracting the two samples $A_1$, $A_2$ from each other according to the present invention.

The result of the combination is the directional signal R beginning after two samples each with the associated samples $A_1$, $A_2$ beginning with a logic transition from a low logic level to a high logic level and stored as the directional signal R at the time instant $t_2+\Delta t$ or output as the output signal $S_3$ at the output terminal 106a. Since, in the embodiment illustrated in FIG. 5, the signal value $A_2$ is greater than the signal value $A_1$, due to a subtraction of the signal value $A_2$ from the signal value $A_1$, a negative value of the directional signal R results, which indicates a first direction (right-hand motion) of the gear, wherein in a subtraction of the first signal value $A_1$ from the second signal value $A_2$ a positive value for the directional signal R is obtained, which indicates the opposite direction of the indicator object.

The time delay $\Delta t$ exemplarily shown in FIG. 6f is to indicate a time delay contingent on circuit technology in practice. The time delay 66 t for example serves to give a sample&hold circuit enough time, for example, to store the measurement value $A_2$. The time delay $\Delta t$, however, may for example also serve to make computation time available for a digital circuit, until for example the measurement value $A_2$ is stored.

With reference to the combination of the first and second sample signals, a multiplicity of calculation possibilities are possible, with the subtraction seeming most simple to realize technically.

After the directional signal R has been provided, the cycle for sensing the direction and optionally the velocity begins again. As already indicated, the principle waveforms for the right-hand motion of a gear illustrated in FIGS. 6a-f are exemplarily indicated.

For a left-hand motion of the gear, the above-illustrated time axis may be imagined as passed through in reverse or opposite manner, i.e. the waveforms $S_x$, $S_y$ in FIGS. 6a, 6b are passed through in opposite directions.

In a left-hand motion of the gear, thereby the first sampled signal $A_1$ is derived from the signal value $S_{dy2}$, wherein the second sampled signal $A_2$ is derived from the signal value $S_{dy1}$. Therefrom, by the subtraction of the first signal value from the second sampled signal value, a sign reversal of the directional signal R results, wherein a negative sign of the directional signal R would thus mean a rotational direction to the right and a positive sign of the directional signal R a rotational direction to the left of the indicator object (e.g. a gear) in the embodiment illustrated in FIG. 5.

The reason why the output signal $S_x$ of the xMR bridge circuit 102 is used for the determination of the sample time instant according to the invention, lies in the fact that this evaluation signal $S_x$ always comprises a zero crossing as a matter of principle, because the direction of the horizontal magnetic field component $H_x$ reverses, and thus simply a zero point comparator may be used for the determination of the zero crossings (and thus the reversal points) of the waveform of the evaluation signal $S_x$.

If a pole wheel arrangement is used instead of a backbias arrangement, i.e. a gear or gear rack arrangement with a backbias magnet, also the course $H_y$ of the vertical magnetic field component in principle always has a zero crossing, because then also the direction of the vertical magnetic field component of the magnetic field reverses, so that the horizontal and vertical magnetic field components $H_x$, $H_y$ are equal with reference to the waveform to be evaluated for the determination of the sample time instants, so that for example also the magnetic field sensing means 102, 104 illustrated in FIG. 5 may be interchanged.

In summary, the basic principle of the embodiments of the present invention previously illustrated may thus be summarized in that, according to the present invention, it is taken advantage of the fact that the vertical ($H_y$) and the horizontal ($H_x$) magnetic field components of the magnetic field, both in a so-called backbias arrangement, i.e. an arrangement of magnet sensor gear or gear rack, and in a pole wheel arrangement comprising a pole wheel or a pole bar with magnetized poles and a sensor in front, the extreme values, i.e. the maxima and minima, of the courses of the vertical components of the magnetic field, viewed locally, are always where the courses of the horizontal magnetic field component have their zero crossing (reversal point).

When using a pole bar or a pole wheel, the vertical magnetic field component looses its offset portion and also comprises zero crossings at the reversal points of the waveform, whereby the statement made above also applies the other way round. In other words, this means that then in addition also the course of the horizontal magnetic field component of the magnetic field has its extreme values, i.e. maxima and minima, exactly where the zero crossings (reversal points) of the vertical component are.

If two different types of magnetic field sensing means are used, which are, however, preferably arranged immediately adjacent to each other, and of which one magnetic field sensing means is sensitive with reference to the vertical magnetic field component and the other magnetic field sensing means is sensitive with reference to the horizontal magnetic field component, both the direction (rotational direction or movement direction) of an indicator object and the velocity (rotation velocity, movement velocity, longitudinal velocity) may easily be determined by measuring or sampling the course of the vertical magnetic field component at two successive zero crossings of the horizontal magnetic field component and assessing these values, i.e. for example subtracting them from each other. The sign of this difference formation then represents the movement or rotational direction of the indicator object.

In pole wheel applications or in a differential arrangement of the two types of magnetic field sensing means, the functions of the magnetic field sensing means for sensing the vertical and horizontal magnetic field components may also be interchanged.

According to a further embodiment of the present invention, now the use of a differential embodiment of the inventive circuitry 100 with two different magnetic field sensing means 102, 104 is explained on the basis of FIG. 7. In this embodiment, two magnetic field sensing means 102-1, 102-2 and 104-1, 104-2 of the same type each are preferably arranged at the distance of the pitch length, i.e. the distance of the teeth in a backbias arrangement or the distance of the pole pairs in a pole wheel arrangement, preferably in the middle of an integrated semiconductor circuit chip, wherein the difference is formed of the signals of the two magnetic field sensing means 102-1, 102-2 and 104-1, 104-2 of the same type each, in order to obtain the first and second output signals $S_1$, $S_2$.

In this embodiment, it is to be noted that this further inventive arrangement does not change the relative conditions or phase locations of the waveforms (of FIGS. 6a-f) described previously, which are formed from the course of the vertical magnetic field component $H_y$ and from the course of the horizontal magnetic field component $H_x$. Hence, also in a differential embodiment of the two magnetic field sensing means, the evaluation of the evaluation signals $S_1$ ($S_x$) and $S_2$ ($S_y$) may take place, as this has already been explained in detail with reference to FIGS. 1 to 6 previously.

In a differential embodiment of the inventive arrangement 100 for the determination of a momentary relative direction of an indicator object, the doubling of the signal values and also that the evaluation signal $S_y$ generated from the course of the vertical magnetic field component no longer has an offset portion, even if the indicator object is for example formed as gear or gear rack, is advantageous. Thereby, the two differential signals $S_1$ and $S_2$ obtained from the courses of the vertical and horizontal magnetic field components are again equivalent also in a backbias arrangement and may be interchanged in their functions as evaluation signals for providing the sample time instants and for providing the samples.

In the following, now a further inventive embodiment using a pole wheel in a differential connection in the magnetic field sensing means is described on the basis of FIGS. 7, 8a-b.

Figure 8A:
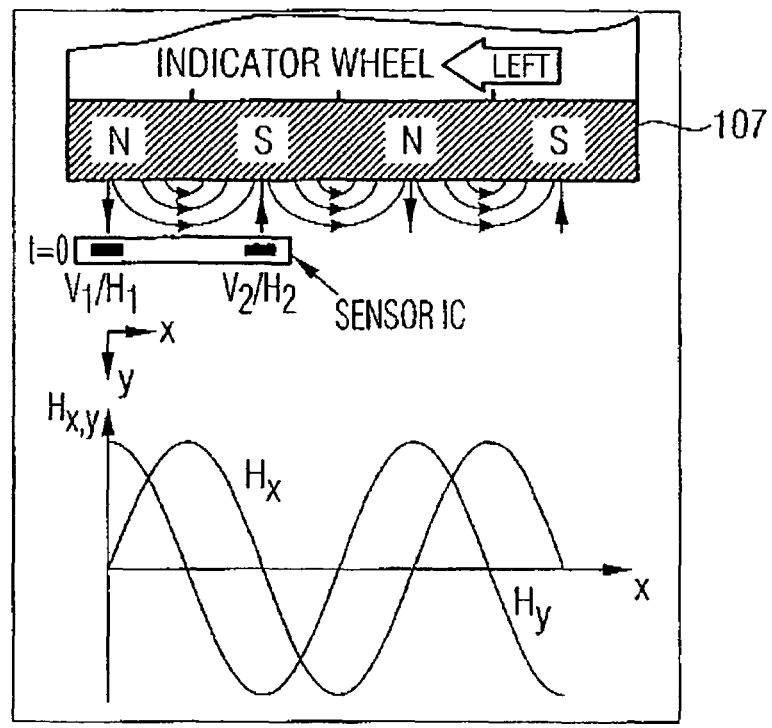
FIGS. 8a-b show principle courses of the magnetic field components in a pole wheel and the corresponding signals in the direction recognition according to the circuitry of the present invention with reference to the further embodiment of the present invention.

The field course of the horizontal and vertical magnetic field components of the magnetic field when using a pole wheel is illustrated in FIG. 8a. In this figure, also an exemplary sensor IC 100 with the two magnetic field sensing means 102-1, 102-2 ($H_1$, $H_2$), which sense the horizontal magnetic field component $H_x$, and the two magnetic field sensing means 104-1, 104-2 ($V_1$, $V_2$), which sense the vertical magnetic field component $H_y$ of the magnetic field, is illustrated, wherein also their geometric arrangement on the sensor IC is illustrated, i.e. the distance of the two magnetic field sensing means of one type preferably corresponds to the pitch length of the pole wheel. The position of the sensor IC in FIG. 8a determines the time instant $t=0$ for the following operations. A corresponding circuit, as has been described with reference to FIG. 5, serves as evaluation circuit. But a substantial difference is that the evaluation signals $S_x$ and $S_y$ are formed of the differential signals of the two probe types here, as this is illustrated due to the principle circuit construction of FIG. 7 for the evaluation of the velocity (rotational speed) and/or the direction (rotational direction) of an indicator object.

Figure 8B:
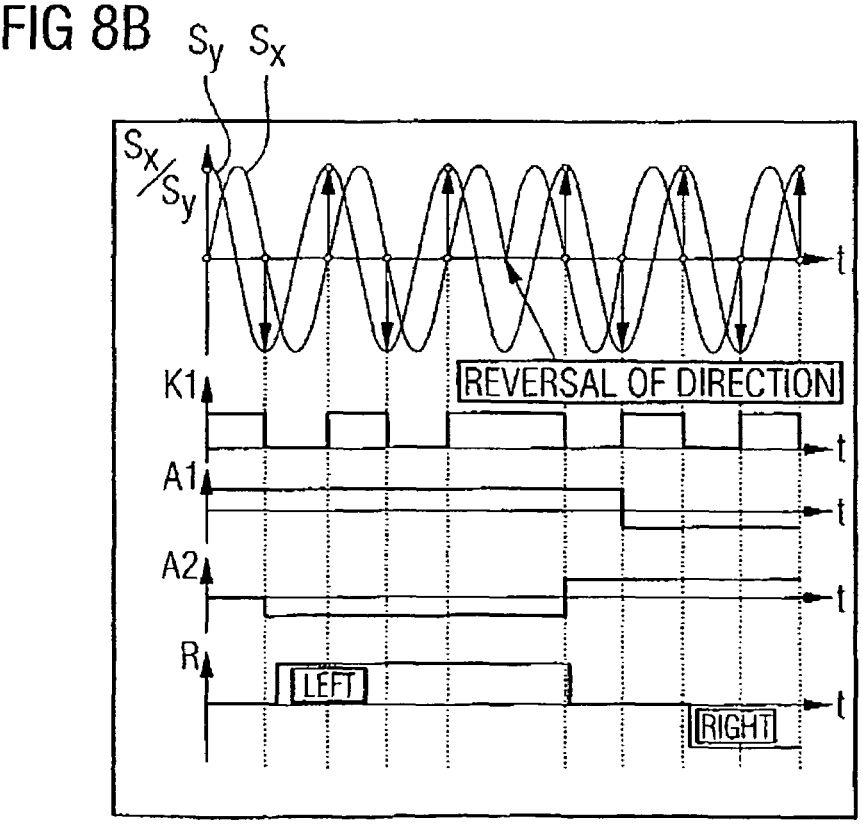
Figure 9:
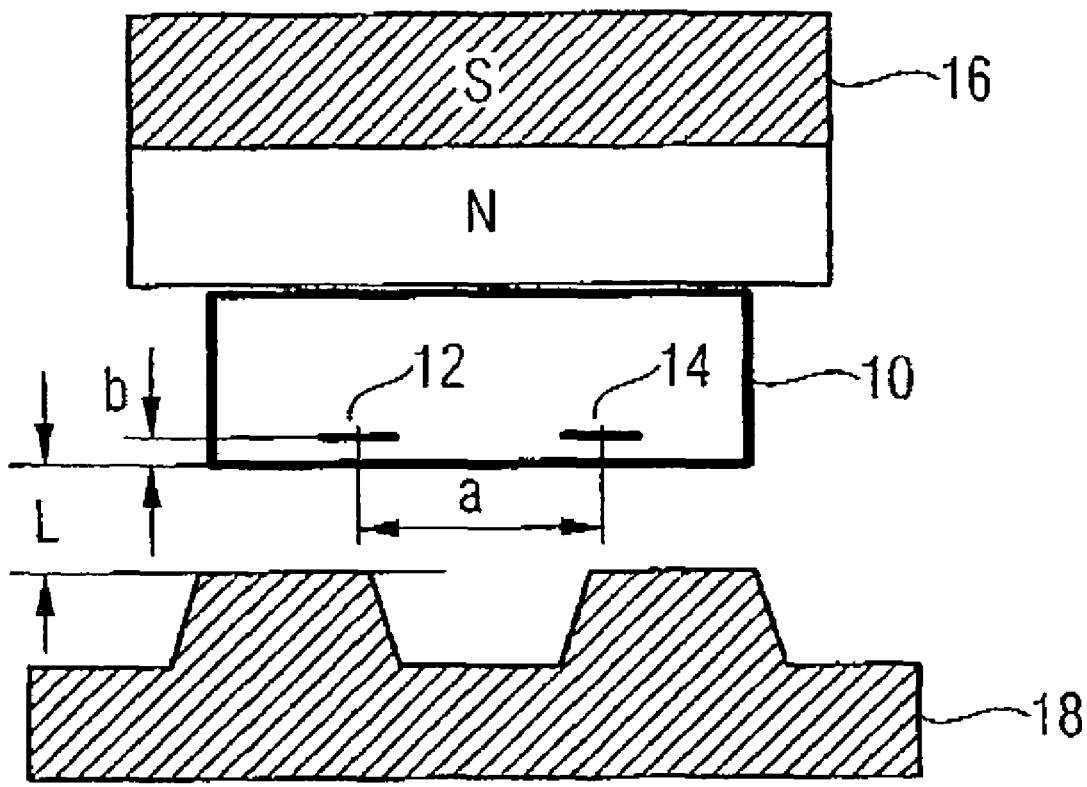
FIG. 9 is a principle illustration of a known sensor arrangement for magnetic field sensing of an indicator gear according to the prior art.

For more detailed explanation of the functioning of the circuitry 100 illustrated in FIG. 7 for the evaluation of the velocity (rotational speed) and the direction (rotational direction) of an indicator object, the waveforms in FIG. 8b are illustrated. If the indicator wheel moves to the left from the position at the time instant $t=0$, as it is illustrated in FIG. 8a, the waveforms $S_x$ are obtained at the inputs of the comparator means 110 and the waveform $S_y$ at the inputs of the amplifier means 112 (differential amplifier). The signals of the xMR bridge circuits 102-1, 102-2 were chosen for the control of the comparator circuit 110, because these signals generally have a higher signal to noise distance, and thus less jitter occurs at the switching edge.

The output signal $K_1$ of the comparator means 110 may on the one hand directly serve as rotational speed signal and may also be used for the determination of the sample time instants of the directional signals. With each rising edge of the output signal $K_1$ of the comparator means 110, i.e. with each transition from a low logic level to a logic high level (LH), the first sample $A_1$ is stored, and a new direction recognition cycle begins. With each falling edge of the comparator signal $K_1$, i.e. with each transition from a high logic level to a low logic level (HL), the second sample $A_2$ of the directional signal is stored. From these two samples $A_1, A_2$, now the difference is formed and the directional signal R is output after a given delay time $\Delta t$.

If the rotational direction changes, the phase location between the signals $S_x$ and $S_y$, and thus also as a result the sign of the directional signal R, also changes, as this is also particularly illustrated in FIG. 8b.

Since the reversal points are used in the waveform of the evaluation signals in the present invention, i.e. the steepest sections in the waveform of the evaluation signals, the determination of the rotational or movement direction of the object may take place with very high accuracy, with low phase noise, little signal jitter, etc. Furthermore, the inventive arrangement thereby is particularly insensitive to positioning inaccuracies of the sensing means with reference to the indicator object. This also leads to simplify the evaluation of the evaluation signals, so that according to the present invention also the circuit overhead may be kept relatively low.

Furthermore, a very compact arrangement of the sensor elements is possible, because these are to be arranged immediately adjacent to each other. In the prior art, a certain distance is required to sense different signals.

According to the present invention, an inventive method for the determination of a momentary, relative direction of an indicator object depending on a magnetic field influenced or generated by the indicator object, wherein the magnetic field comprises a first magnetic field component and a second magnetic field component, which are preferably substantially perpendicular to each other, consists in sensing a course of the first magnetic field component, sensing a course of the second magnetic field component, and evaluating the course of the first magnetic field component and of the second magnetic field component in order to determine the momentary, relative direction of the indicator object. According to the inventive method, particularly depending on the first magnetic field component, a first evaluation signal and, according to the second magnetic field component, a second evaluation signal is generated, from which the direction and/or movement velocity of an indicator object relative to the sensing means can be determined. For this, a reversal point or zero crossing of one of the evaluation signals and the slope in this point are determined, whereupon the momentary value or the sign of the respective other evaluation signal is checked, wherein a fixed rotational direction each may be associated depending on the phase location of the reversal point (zero crossing) and the direction of the zero crossing from the momentary value (sign) of the respective other evaluation signal.

Depending on the conditions, the inventive method for the determination of a momentary, relative direction of an indicator object may be implemented in hardware or in software. The implementation may take place on a digital storage medium, in particular a floppy disc or CD with electronically readable control signals, which are able to cooperate with a programmable computer system, so that the corresponding method is executed. In general, the invention thus also consists in a computer program product with program code stored on a machine-readable carrier for performing the inventive method, when the computer program product is executed on a computer. In other words, the invention may thus be realized as a computer program with a program code for performing the method, when the computer program is executed.

While this invention has been described in terms of several preferred embodiments, there are alterations, permutations, and equivalents which fall within the scope of this invention. It should also be noted that there are many alternative ways of implementing the methods and compositions of the present invention. It is therefore intended that the following appended claims be interpreted as including all such alterations, permutations, and equivalents as fall within the true spirit and scope of the present invention.

What is claimed is:

1. An apparatus for the determination of a momentary relative direction or velocity of an indicator object depending on a magnetic field influenced or generated by the indicator object, comprising:

a first sensor for providing a first evaluation signal based on sensing a course of a first magnetic field component of the magnetic field sensed in a first sensing plane;

a second sensor for providing a second evaluation signal based on sensing a course of a second magnetic field component of the magnetic field sensed in a second sensing plane, wherein the first and second sensors are arranged adjacent to each other; and an evaluator for evaluating the course of the first evaluation signal magnetic field component and the second evaluation signal magnetic field component in order to determine the momentary, relative direction and the velocity of movement of the indicator object, the first sensing plane for the first magnetic field component and the second sensing plane for the second magnetic field component being offset in angle with respect to each other, wherein the evaluator is configured to determine a reversal point of one of the first and second evaluation signals, a slope at the reversal point of the one evaluation signal, and a momentary value or the sign of the respective other evaluation signal when the reversal point is determined.

2. The apparatus of claim 1, wherein the first sensing plane for the first magnetic field component and the second sensing plane for the second magnetic field component are substantially perpendicular to each other.

3. The apparatus of claim 1, wherein the first and second sensors are arranged substantially perpendicular to the relative direction of the indicator object and spaced at a given distance from the indicator object.

4. The apparatus of claim 2, wherein the first sensing plane for the first magnetic field component is substantially parallel to the relative direction of the indicator object, and wherein the second sensing plane for the second magnetic field component is substantially perpendicular to the relative direction of the indicator object.

5. The apparatus of claim 1, wherein the first and second sensors are arranged immediately adjacent to each other.

6. The apparatus of claim 1, wherein the first and second sensors are arranged on a support and on top of each other with reference to the relative direction of the indicator object.

7. The apparatus of claim 6, wherein the first and second sensors are integrated on a semiconductor sensor integrated circuit.

8. The apparatus of claim 1, wherein the indicator object is a gear, a gear rack, a pole wheel, or a pole bar.

9. The apparatus of claim 1, wherein the relative direction is the direction of movement or direction of rotation of the indicator object relative to the first and second sensing plane of the first and second sensors, respectively.

10. The apparatus of claim 1, wherein the relative velocity is the longitudinal velocity or rotation velocity of the indicator object relative to the first and second sensing plane of the first and second sensors, respectively.

11. The apparatus of claim 1, wherein the first sensor provides a first evaluation signal and the second sensor a second evaluation signal, wherein the evaluator is formed to determine a reversal point of one of the evaluation signals and the slope in the reversal point of the one evaluation signal, and to assert the momentary value or the sign of the respective other evaluation signal, with a direction of rotation of the indicator object each being fixedly associated with each momentary value of or sign with reference to the reversal point is indicative of a direction of rotation of the indicator object.

12. The apparatus of claim 11, wherein the first and second evaluation signals are phase-shifted by 90° with respect to each other.

13. The apparatus of claim 1, wherein the first sensor and/or second sensors comprises a sensor element of selected from a first group of sensor elements, the first group comprising AMR, GMR, TMR, CMR elements (AMR=anisotropic magnetoresistance, GMR=giant magnetoresistance, TMR=tunnel magnetoresistance, CMR=colossal magnetoresistance), vertical Hall sensor elements, horizontal Hall sensor elements, magnetoresistor elements, magnetotranisator elements (MAGFETs), giant planar Hall-effect sensors, spin transistors, or GMI (giant magnetic impedance) elements, or magnetodiodes; and
wherein the second sensor comprises a sensor element selected from a second group of sensor elements, the second group comprising horizontal Hall sensor elements, magnetoresistive elements, magnetotransistor elements (MAG-FETs), or magnetodiodes.

14. The apparatus of claim 1, wherein the first sensor comprises a sensor element sensitive with reference to the first magnetic field component, and wherein the second sensor comprises a sensor element sensitive with reference to the second magnetic field component.

15. The apparatus of claim 1, wherein the first and/or second magnetic field sensors comprise a plurality of sensor elements.

16. The apparatus of claim 15, wherein the plurality of sensor elements is connected in a bridge circuit.

17. The apparatus of claim 1, wherein the first sensor comprises two sensor elements at a give distance and the second sensor two sensor elements at a given distance.

18. The apparatus of claim 17, wherein the two sensor elements of the first sensor are equal, and wherein the two sensor elements of the second sensor are equal.

19. The apparatus of claim 17, wherein the waveforms of the two sensor elements of the first sensor and the waveforms of the two sensor elements of the second sensor are processed further differentially.

20. The apparatus of claim 17, wherein the two sensor elements of the first sensor and the two sensor elements of the second sensor are each arranged at a pitch distance of the indicator object with respect to each other.

21. A method of determining a momentary, relative direction of an indicator object depending on a magnetic field influenced or generated by the indicator object, comprising the steps of:
sensing a course of a first magnetic field component in a first sensing plane and providing a first evaluation signal;
sensing a course of a second magnetic field component in a second sensing plane adjacent to the sensing the course of the first magnetic field component in the first sensing plane and providing a second evaluation signal; and
evaluating the course of the first evaluation signal magnetic field component and the second evaluation signal magnetic field component by determining a reversal point of one of the first and second evaluation signals, a slope at the reversal point of the one evaluation signal, and a momentary value or sign of the respective other evaluation signal when the reversal point is determined in order to determine the momentary, relative direction and the velocity of movement of the indicator object, the first sensing plane for the first magnetic field component and the second sensing plane for the second magnetic field component being offset in angle with respect to each other.

22. A computer program with a program code for performing, when the computer program is executed on a computer, the method of determining a momentary, relative direction of an indicator object depending on a magnetic field influenced or generated b the indicator object, comprising the steps of:
sensing a course of a first magnetic field component in a first sensing plane and providing a first evaluation signal;
sensing a course of a second magnetic field component in a second sensing plane adjacent to the sensing the course of the first magnetic field component in the first sensing plane and providing a second evaluation signal; and
evaluating the course of the first evaluation signal magnetic field component and the second evaluation signal magnetic field component by determining a reversal point of one of the first and second evaluation signals, a slope at the reversal point of the one evaluation signal, and a momentary value or the sign of the respective other evaluation signal when the reversal point is determined in order to determine the momentary, relative direction and the velocity of movement of the indicator object, the first sensing plane for the first magnetic field component and the second sensing plane for the second magnetic field component being offset in angle with respect to each other.

23. An apparatus for the determination of a momentary relative direction of an indicator object depending on a magnetic field influenced or generated by the indicator object, comprising:
a first sensor for sensing a course of a first magnetic field component of the magnetic field in a first sensing direction;
a second sensor for sensing a course of a second magnetic field component of the magnetic field in a second sensing direction and adjacent to the sensing the course of the first magnetic field component; and
an evaluator for evaluating the course of the first and second magnetic field components of the magnetic field influenced or generated by the indicator object, in order to determine the momentary, relative direction and the velocity of movement of the indicator object, the first magnetic field component and the second magnetic field component being offset in angle with respect to each other,
wherein the first sensor provides a first evaluation signal and the second sensor a second evaluation signal, wherein the evaluator is formed to determine a reversal point of one of the first and second evaluation signals and a slope at the reversal point of the one evaluation signal, and a momentary value or the sign of the respective other evaluation signal when the reversal point is determined.

24. The apparatus of claim 23, wherein the first and second evaluation signals are phase-shifted by 90° with respect to each other.

25. An apparatus for the determination of a momentary relative direction of movement of an indicator object depending on a magnetic field influenced or generated by the indicator object, comprising:
a first magnetic field sensor for providing a first evaluation signal based on a first magnetic field component of the magnetic field which permeates the first magnetic field sensor, the first magnetic field sensor having a magnetic field sensitivity with respect to a first magnetic field component direction; and
a second magnetic field sensor for providing a second evaluation signal based on a second magnetic field component of the magnetic field which permeates the second magnetic field sensor, the second magnetic field sensor having a magnetic field sensitivity with respect to a second magnetic field component direction;
wherein the first and second magnetic field sensors are arranged adjacent to each other,
wherein the first magnetic field component direction and the second magnetic field component direction are offset in angle with respect to each other, and
wherein, based on the first evaluation signal and the second evaluation signal, the momentary, relative direction of movement and velocity of movement of the indicator object is determinable
an evaluator for evaluating the first evaluation signal and the second evaluation signal, the evaluator being formed to provide an output signal comprising information on the momentary, relative direction of movement or velocity of movement of the indicator object with respect to the first and second magnetic field sensors, wherein the evaluator is formed to determine a reversal point, a phase position at the reversal point of the first evaluation signal, and a momentary value or the sign of the second evaluation signal when the reversal point is determined.

26. The apparatus of claim 25, wherein the first magnetic field component direction and the second magnetic field component direction are in one indicator object plane, wherein the indicator object plane is defined by the indicator object and at least one of the first and second magnetic field sensors, wherein the indicator object plane is parallel to the relative direction of movement of the indicator object and passes through the indicator object and at least one of the first and second magnetic field sensors in a perpendicular manner.

27. The apparatus of claim 25, wherein the evaluator is formed to determine a reversal point and the phase position in the reversal point of the first evaluation signal, and to assert the momentary value or the sign of the second evaluation signal, with a direction of rotation of the indicator object each being fixedly associated with each momentary value or sign of the second evaluation signal with reference to the phase position in the reversal point of the first evaluation signal is indicative of the direction of rotation of the indicator object.

28. The apparatus of claim 25, wherein the evaluator is formed to determine a reversal point and the phase position in the reversal point of the second evaluation signal and to assert the momentary value or the sign of the first evaluation signal, with a direction of rotation or the indicator object each being fixedly associated with wherein each momentary value or sign of the first evaluation signal with reference to the phase position in the reversal point of the second evaluation signal is indicative of the direction of rotation of the indicator object.

29. A method of determining a momentary, relative direction of movement of an indicator object depending on a magnetic field influenced or generated by the indicator object, comprising the steps of:
sensing a first magnetic field component of the magnetic field with respect to a first magnetic field component direction;
providing a first evaluation signal based on the first magnetic field component sensed in the first magnetic field component direction;
sensing a second magnetic field component of the magnetic field with respect to a second magnetic field component direction adjacent to the sensing of the first magnetic field component;
providing a second evaluation signal based on the second magnetic field component sensed in the second magnetic field component direction, wherein the first magnetic field component direction and the second magnetic field component direction are offset in angle with respect to each other; and
evaluating the first evaluation signal and the second evaluation signal by determining a reversal point of one of the first and second evaluation signals, a slope in at reversal point of the one evaluation signal, and a momentary value or the sign of the respective other evaluation signal when the reversal point is determined, in order to provide an output signal comprising information on the momentary, relative direction of movement and velocity of movement of the indicator object.

30. A computer program with a program code for performing, when the computer program is executed on a computer, the method of determining a momentary, relative direction of movement of an indicator object depending on a magnetic field influenced or generated by the indicator object, comprising the steps of:
sensing a first magnetic field component of the magnetic field with respect to a first magnetic field component direction;
providing a first evaluation signal based on the first magnetic field component sensed in the first magnetic field component direction;
sensing a second magnetic field component of the magnetic field with respect to a second magnetic field component direction adjacent to the sensing of the first magnetic field component;
providing a second evaluation signal based on the second magnetic field component sensed in the second magnetic field component direction, wherein the first magnetic field component direction and the second magnetic field component direction are offset in angle with respect to each other; and
evaluating the first evaluation signal and the second evaluation signal by determining a reversal point of one of the first and second evaluation signals, a slope at the reversal point of the one evaluation signal, and a momentary value or the sign of the respective other evaluation signal when the reversal point is determined in order to provide an output signal comprising information on the momentary, relative direction of movement and velocity of movement of the indicator object.

* * * * *

UNITED STATES PATENT AND TRADEMARK OFFICE
CERTIFICATE OF CORRECTION

PATENT NO. : 7,535,215 B2
APPLICATION NO. : 11/100231
DATED : May 19, 2009
INVENTOR(S) : Bernhard Forster It is certified that error appears in the above-identified patent and that said Letters Patent is hereby corrected as shown below:

In the Claims:

Col. 18, line 19 claim 1 should read

--1. An apparatus for the determination of a momentary relative direction or velocity of an indicator object depending on a magnetic field influenced or generated by the indicator object, comprising:
a first sensor for providing a first evaluation signal based on a first magnetic field component of the magnetic field sensed in a first sensing plane;
a second sensor for providing a second evaluation signal based on a second magnetic field component of the magnetic field sensed in a second sensing plane, wherein the first and second sensors are arranged adjacent to each other; and
an evaluator for evaluating the course of the first evaluation signal and the second evaluation signal in order to determine the momentary, relative direction and the velocity of movement of the indicator object, the first sensing plane for the first magnetic field component and the second sensing plane for the second magnetic field component being offset in angle with respect to each other, wherein the evaluator is configured to determine a reversal point of one of the first and second evaluation signals, a slope at the reversal point of the one evaluation signal, and a momentary value or the sign of the respective other evaluation signal when the reversal point is determined.--

Col. 18, line 44 claim 2 should read

--2. The apparatus of claim 1, wherein the first sensing plane for the first magnetic field component and the second sensing plane for the second magnetic field component are substantially perpendicular to each other.--

Col. 18 , line 48 claim 3 should read

--3. The apparatus of claim 1, wherein the first and second sensors are arranged substantially perpendicular to the relative direction of the indicator object and spaced at a given distance from the indicator object.--

UNITED STATES PATENT AND TRADEMARK OFFICE
CERTIFICATE OF CORRECTION

PATENT NO. : 7,535,215 B2
APPLICATION NO. : 11/100231
DATED : May 19, 2009
INVENTOR(S) : Bernhard Forster It is certified that error appears in the above-identified patent and that said Letters Patent is hereby corrected as shown below:

Col. 18, line 52 claim 4 should read

--4. The apparatus of claim 2, wherein the first sensing plane for the first magnetic field component is substantially parallel to the relative direction of the indicator object, and wherein the second sensing plane for the second magnetic field component is substantially perpendicular to the relative direction of the indicator object.--

Col. 18, line 58 claim 5 should read

--5. The apparatus of claim 1, wherein the first and second sensors are arranged immediately adjacent to each other.--

Col. 18, line 60 claim 6 should read

--6. The apparatus of claim 1, wherein the first and second sensors are arranged on a support and on top of each other.--

Col. 18, line 63 claim 7 should read

--7. The apparatus of claim 1, wherein the indicator object is a gear, a gear rack, a pole wheel, or a pole bar.--

Col. 18, line 66 claim 8 should read

--8. The apparatus of claim 1, wherein the relative direction is the direction of movement or direction of rotation of the indicator object relative to the first and second sensing plane of the first and second sensors, respectively.--

Col. 19, line 1 claim 9 should read

--9. The apparatus claim 1, wherein the relative velocity is the longitudinal velocity or rotation velocity of the indicator object relative to the first and second sensing plane of the first and second sensors, respectively.--

UNITED STATES PATENT AND TRADEMARK OFFICE
CERTIFICATE OF CORRECTION

PATENT NO. : 7,535,215 B2
APPLICATION NO. : 11/100231
DATED : May 19, 2009
INVENTOR(S) : Bernhard Forster It is certified that error appears in the above-identified patent and that said Letters Patent is hereby corrected as shown below:

Col. 19, line 5 claim 10 should read

--10. The apparatus of claim 1, wherein each momentary value or sign with reference to the reversal point is indicative of a direction of rotation of the indicator object.--

Col. 19, line 9 claim 11 should read

--11. The apparatus of claim 10, wherein the first and second evaluation signals are phase-shifted by 90° with respect to each other.--

Col. 19, line 20 claim 12 should read

--12. The apparatus of claim 1, wherein the first sensor comprises a sensor element selected from a first group of sensor elements, the first group comprising AMR, GMR, TMR, CMR elements (AMR = anisotropic magnetoresistance, GMR = giant magnetoresistance, TMR = tunnel magnetoresistance, CMR = colossal magnetoresistance), vertical Hall sensor elements, giant planar Hall-effect sensors, spin transistors, or GMI (giant magnetic impedance) elements; and
wherein the second sensor comprises a sensor element selected from a second group of sensor elements, the second group comprising horizontal Hall sensor elements, magnetoresistive elements, magnetotransistor elements (MAG-FETs), or magnetodiodes.--

Col. 19, line 22 claim 13 should read

--13. The apparatus of claim 1, wherein the first sensor comprises a sensor element sensitive with reference to the first magnetic field component, and wherein the second sensor comprises a sensor element sensitive with reference to the second magnetic field component.--

UNITED STATES PATENT AND TRADEMARK OFFICE
CERTIFICATE OF CORRECTION

| | |
|---|---|
| PATENT NO. | : 7,535,215 B2 |
| APPLICATION NO. | : 11/100231 |
| DATED | : May 19, 2009 |
| INVENTOR(S) | : Bernhard Forster |

It is certified that error appears in the above-identified patent and that said Letters Patent is hereby corrected as shown below:

Col. 19, line 39 claim 14 should read

--14. The apparatus of claim 1, wherein the first and/or second magnetic field sensors comprise a plurality of sensor elements.--

Col. 19, line 44 claim 15 should read

--15. The apparatus of claim 14, wherein the plurality of sensor elements is connected in a bridge circuit.--

Col. 19, line 47 claim 16 should read

--16. The apparatus of claim 1, wherein the first sensor comprises two sensor elements at a given distance and the second sensor two sensor elements at a given distance.--

Col. 19, line 49 claim 17 should read

--17. The apparatus of claim 16, wherein the two sensor elements of the first sensor are equal, and wherein the two sensor elements of the second sensor are equal.--

Col. 19, line 53 claim 18 should read

--18. The apparatus of claim 16, wherein the waveforms of the two sensor elements of the first sensor and the waveforms of the two sensor elements of the second sensor are processed further differentially.--

Col. 19, line 55 claim 19 should read

--19. The apparatus of claim 16, wherein the two sensor elements of the first sensor and the two sensor elements of the second sensor are each arranged at a pitch distance of the indicator object with respect to each other.--

UNITED STATES PATENT AND TRADEMARK OFFICE
CERTIFICATE OF CORRECTION

| | |
|---|---|
| PATENT NO. | : 7,535,215 B2 |
| APPLICATION NO. | : 11/100231 |
| DATED | : May 19, 2009 |
| INVENTOR(S) | : Bernhard Forster |

It is certified that error appears in the above-identified patent and that said Letters Patent is hereby corrected as shown below:

Col. 19, line 60 claim 20 should read

--20. A method of determining a momentary, relative direction of an indicator object depending on a magnetic field influenced or generated by the indicator object, comprising the steps of:
sensing a course of a first magnetic field component in a first sensing plane and providing a first evaluation signal;
sensing a course of a second magnetic field component in a second sensing plane adjacent to the sensing the course of the first magnetic field component in the first sensing plane and providing a second evaluation signal; and
evaluating the course of the first evaluation signal and the second evaluation signal by determining a reversal point of one of the first and second evaluation signals, a slope at the reversal point of the one evaluation signal, and a momentary value or sign of the respective other evaluation signal when the reversal point is determined in order to determine the momentary, relative direction and the velocity of movement of the indicator object, the first sensing plane for the first magnetic field component and the second sensing plane for the second magnetic field component being offset in angle with respect to each other.--

Col. 19, line 64 claim 21 should read

--21. A computer program with a program code for performing, when the computer program is executed on a computer, the method of determining a momentary, relative direction of an indicator object depending on a magnetic field influenced or generated by the indicator object, comprising the steps of:
sensing a course of a first magnetic field component in a first sensing plane and providing a first evaluation signal;
sensing a course of a second magnetic field component in a second sensing plane adjacent to the sensing the course of the first magnetic field component in the first sensing plane and providing a second evaluation signal; and
evaluating the course of the first evaluation signal and the second evaluation signal by determining a reversal point of one of the first and second evaluation signals, a slope at the reversal point of the one evaluation signal, and a momentary value or the sign of the respective other evaluation signal when the reversal point is determined in order to determine the momentary, relative direction and the velocity of movement of the indicator object, the first sensing plane for the first magnetic field component and the second sensing plane for the second magnetic field component being offset in angle with respect to each other.--

UNITED STATES PATENT AND TRADEMARK OFFICE
CERTIFICATE OF CORRECTION

| | |
|---|---|
| PATENT NO. | : 7,535,215 B2 |
| APPLICATION NO. | : 11/100231 |
| DATED | : May 19, 2009 |
| INVENTOR(S) | : Bernhard Forster |

It is certified that error appears in the above-identified patent and that said Letters Patent is hereby corrected as shown below:

Col. 20, line 21 claim 22 should read

--22. An apparatus for the determination of a momentary relative direction of an indicator object depending on a magnetic field influenced or generated by the indicator object, comprising:
a first sensor for sensing a course of a first magnetic field component of the magnetic field in a first sensing direction;
a second sensor for sensing a course of a second magnetic field component of the magnetic field in a second sensing direction and adjacent to the sensing the course of the first magnetic field component; and
an evaluator for evaluating the course of the first and second magnetic field components of the magnetic field influenced or generated by the indicator object, in order to determine the momentary, relative direction and the velocity of movement of the indicator object, the first magnetic field component and the second magnetic field component being offset in angle with respect to each other, wherein the first sensor provides a first evaluation signal and the second sensor a second evaluation signal, wherein the evaluator is formed to determine a reversal point of one of the first and second evaluation signals and a slope at the reversal point of the one evaluation signal, and a momentary value or the sign of the respective other evaluation signal when the reversal point is determined.--

Col. 20, line 46 claim 23 should read

--23. The apparatus of claim 22, wherein the first and second evaluation signals are phase-shifted by 90° with respect to each other.--

UNITED STATES PATENT AND TRADEMARK OFFICE
CERTIFICATE OF CORRECTION

| | |
|---|---|
| PATENT NO. | : 7,535,215 B2 |
| APPLICATION NO. | : 11/100231 |
| DATED | : May 19, 2009 |
| INVENTOR(S) | : Bernhard Forster |

It is certified that error appears in the above-identified patent and that said Letters Patent is hereby corrected as shown below:

Col. 21, line 5 claim 24 should read

--24. An apparatus for the determination of a momentary relative direction of movement of an indicator object depending on a magnetic field influenced or generated by the indicator object, comprising:
    a first magnetic field sensor for providing a first evaluation signal based on a first magnetic field component of the magnetic field which permeates the first magnetic field sensor, the first magnetic field sensor having a magnetic field sensitivity with respect to a first magnetic field component direction;
    a second magnetic field sensor for providing a second evaluation signal based on a second magnetic field component of the magnetic field which permeates the second magnetic field sensor, the second magnetic field sensor having a magnetic field sensitivity with respect to a second magnetic field component direction;
    wherein the first and second magnetic field sensors are arranged adjacent to each other,
    wherein the first magnetic field component direction and the second magnetic field component direction are offset in angle with respect to each other, and
    an evaluator for evaluating the first evaluation signal and the second evaluation signal, the evaluator being formed to provide an output signal comprising information on the momentary, relative direction of movement or velocity of movement of the indicator object with respect to the first and second magnetic field sensors, wherein the evaluator is formed to determine a reversal point, a phase position at the reversal point of the first evaluation signal, and a momentary value or the sign of the second evaluation signal when the reversal point is determined.--

Col. 21, line 8 claim 25 should read

--25. The apparatus of claim 24, wherein the first magnetic field component direction and the second magnetic field component direction are in one indicator object plane, wherein the indicator object plane is defined by the indicator object and at least one of the first and second magnetic field sensors, wherein the indicator object plane is parallel to the relative direction of movement of the indicator object and passes through the indicator object and at least one of the first and second magnetic field sensors in a perpendicular manner.--

UNITED STATES PATENT AND TRADEMARK OFFICE
CERTIFICATE OF CORRECTION

| | |
|---|---|
| PATENT NO. | : 7,535,215 B2 |
| APPLICATION NO. | : 11/100231 |
| DATED | : May 19, 2009 |
| INVENTOR(S) | : Bernhard Forster |

It is certified that error appears in the above-identified patent and that said Letters Patent is hereby corrected as shown below:

Col. 21, line 52 claim 27 should read

--27. The apparatus of claim 24, wherein each momentary value or sign of the second evaluation signal with reference to the phase position in the reversal point of the first evaluation signal is indicative of the direction of rotation of the indicator object.--

Col. 21, line 61 claim 28 should read

--28. The apparatus of claim 24, wherein the evaluator is formed to determine a reversal point and the phase position in the reversal point of the second evaluation signal and to assert the momentary value or the sign of the first evaluation signal, wherein each momentary value or sign of the first evaluation signal with reference to the phase position in the reversal point of the second evaluation signal is indicative of the direction of rotation of the indicator object.--

Col. 22, line 5 claim 29 should read

--29. A method of determining a momentary, relative direction of movement of an indicator object depending on a magnetic field influenced or generated by the indicator object, comprising the steps of:
sensing a first magnetic field component of the magnetic field with respect to a first magnetic field component direction;
providing a first evaluation signal based on the first magnetic field component sensed in the first magnetic field component direction;
sensing a second magnetic field component of the magnetic field with respect to a second magnetic field component direction adjacent to the sensing of the first magnetic field component;
providing a second evaluation signal based on the second magnetic field component sensed in the second magnetic field component direction, wherein the first magnetic field component direction and the second magnetic field component direction are offset in angle with respect to each other; and
evaluating the first evaluation signal and the second evaluation signal by determining a reversal point of one of the first and second evaluation signals, a slope in at reversal point of the one evaluation signal, and a momentary value or the sign of the respective other evaluation signal when the reversal point is determined, in order to provide an output signal comprising information on the momentary, relative direction of movement and velocity of movement of the indicator object.--

UNITED STATES PATENT AND TRADEMARK OFFICE
CERTIFICATE OF CORRECTION

| | |
|---|---|
| PATENT NO. | : 7,535,215 B2 |
| APPLICATION NO. | : 11/100231 |
| DATED | : May 19, 2009 |
| INVENTOR(S) | : Bernhard Forster |

It is certified that error appears in the above-identified patent and that said Letters Patent is hereby corrected as shown below:

Col. 22, line 34 claim 30 should read

--30. A computer program with a program code for performing, when the computer program is executed on a computer, the method of determining a momentary, relative direction of movement of an indicator object depending on a magnetic field influenced or generated by the indicator object, comprising the steps of:
    sensing a first magnetic field component of the magnetic field with respect to a first magnetic field component direction;
    providing a first evaluation signal based on the first magnetic field component sensed in the first magnetic field component direction;
    sensing a second magnetic field component of the magnetic field with respect to a second magnetic field component direction adjacent to the sensing of the first magnetic field component;
    providing a second evaluation signal based on the second magnetic field component sensed in the second magnetic field component direction, wherein the first magnetic field component direction and the second magnetic field component direction are offset in angle with respect to each other; and evaluating the first evaluation signal and the second evaluation signal by determining a reversal point of one of the first and second evaluation signals, a slope at the reversal point of the one evaluation signal, and a momentary value or the sign of the respective other evaluation signal when the reversal point is determined in order to provide an output signal comprising information on the momentary, relative direction of movement and velocity of movement of the indicator object.--

UNITED STATES PATENT AND TRADEMARK OFFICE
CERTIFICATE OF CORRECTION

PATENT NO. : 7,535,215 B2
APPLICATION NO. : 11/100231
DATED : May 19, 2009
INVENTOR(S) : Bernhard Forster It is certified that error appears in the above-identified patent and that said Letters Patent is hereby corrected as shown below:

Col. 22, line 65 claim 31 should read

--31. The apparatus of claim 6, wherein the first and second sensors are integrated on a semiconductor sensor integrated circuit.--

Signed and Sealed this

Twenty-fifth Day of August, 2009

David J. Kappos
*Director of the United States Patent and Trademark Office*